(12) United States Patent
Bernadac

(10) Patent No.: US 7,600,946 B2
(45) Date of Patent: Oct. 13, 2009

(54) MOORING ARRANGEMENT PROVIDED WITH FLOATING MOBILE SYSTEMS FOR MOVING BOOMS

(76) Inventor: Jean-Claude Bernadac, 64, rue Lambrechts, Courbevoie (FR) F-92400

( * ) Notice: Subject to any disclaimer, the term of this patent is extended or adjusted under 35 U.S.C. 154(b) by 162 days.

(21) Appl. No.: 10/582,175

(22) PCT Filed: Dec. 13, 2004

(86) PCT No.: PCT/FR2004/050686
§ 371 (c)(1),
(2), (4) Date: May 14, 2007

(87) PCT Pub. No.: WO2005/058683
PCT Pub. Date: Jun. 30, 2005

(65) Prior Publication Data
US 2008/0038060 A1 Feb. 14, 2008

(30) Foreign Application Priority Data
Dec. 12, 2003 (FR) .................................. 03 51051

(51) Int. Cl.
*E02B 3/06* (2006.01)
(52) U.S. Cl. .................... 405/219; 405/218; 114/263
(58) Field of Classification Search ......... 405/218–221; 114/263
See application file for complete search history.

(56) References Cited

U.S. PATENT DOCUMENTS

| 3,635,181 | A |   | 1/1972  | Epple et al.              |
|-----------|---|---|---------|---------------------------|
| 3,672,178 | A |   | 6/1972  | Trautwein                 |
| 4,290,381 | A | * | 9/1981  | Penman ............ 405/219 |
| 4,342,277 | A |   | 8/1982  | Sluys                     |
| 4,660,495 | A | * | 4/1987  | Thompson .......... 405/219 |
| 4,940,021 | A | * | 7/1990  | Rytand ............. 405/219 |
| 6,003,464 | A | * | 12/1999 | Long ................ 114/263 |
| 6,089,176 | A | * | 7/2000  | Costello ........... 405/219 |
| 6,205,945 | B1 | * | 3/2001  | Passen et al. ...... 405/219 |

FOREIGN PATENT DOCUMENTS

GB 2 236 716 A 4/1991

* cited by examiner

*Primary Examiner*—Frederick L Lagman
(74) *Attorney, Agent, or Firm*—Wildman, Harrold, Allen & Dixon LLP

(57) ABSTRACT

The inventive arrangement of motorized floating mobile systems (7; 107; 207) for moving mooring booms (4A to 4E) for boats B in inner harbors (P), to translationally move the booms (4A to 4E) perpendicular thereto, to provide maneuvering space for the boats (B), is arranged between at least two adjacent booms (4; 4A to 4E), whereas the other spaces between booms are closed for maneuvering. Each system comprises: means for positioning the booms transverse to the translation direction; means (9, 10) disposed on the two ends of each system for attaching the front portion of adjacent systems together or to an attaching means arranged on the end of a pier or a fixed boom; means for translationally guiding parallel to a pier or a main pontoon, with respect to a fixed point of a pile or dolphin (8); and means for translationally moving the booms in a synchronous manner.

17 Claims, 21 Drawing Sheets

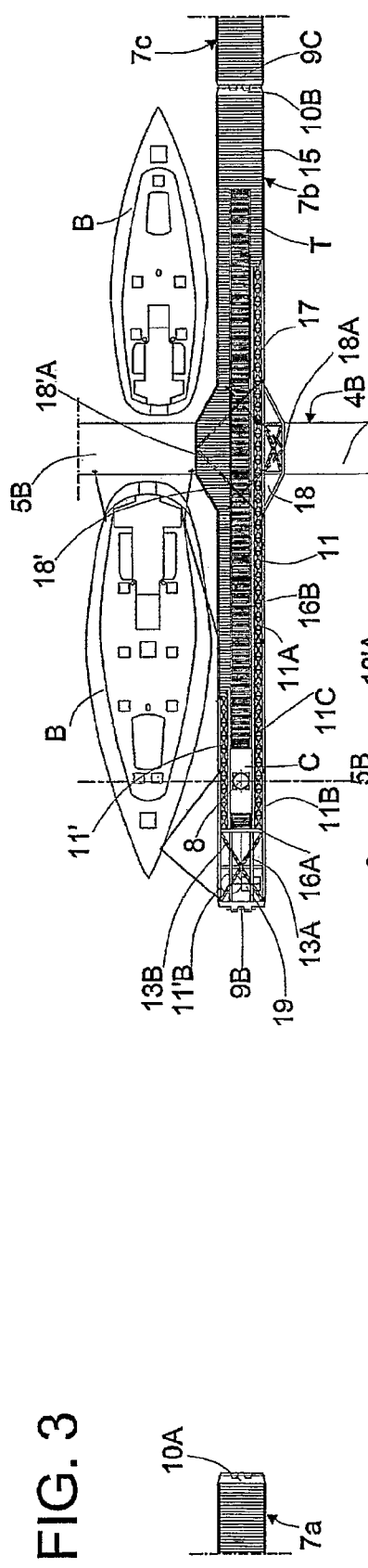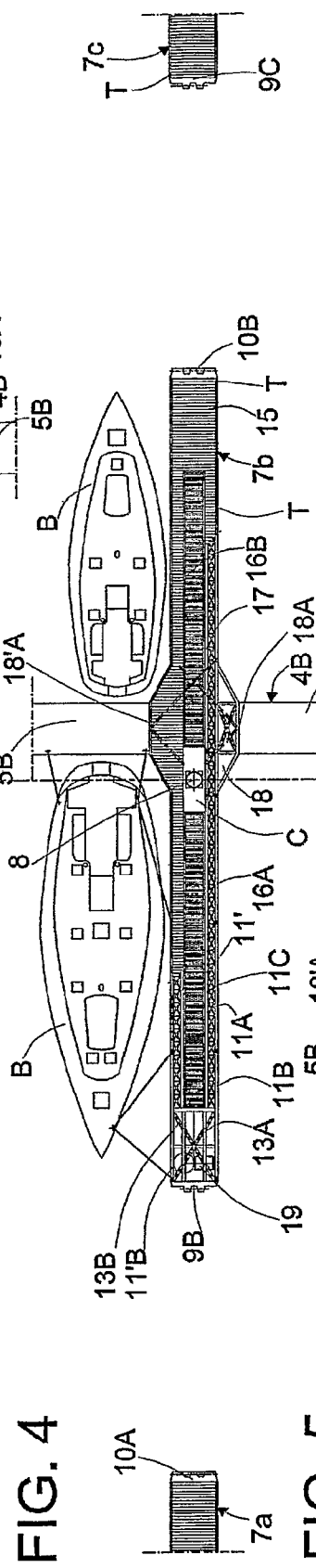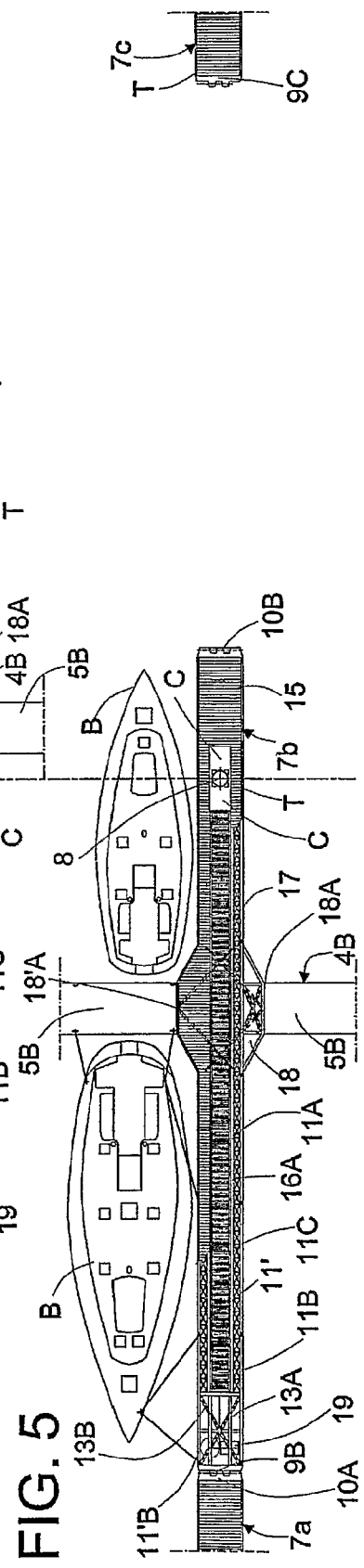

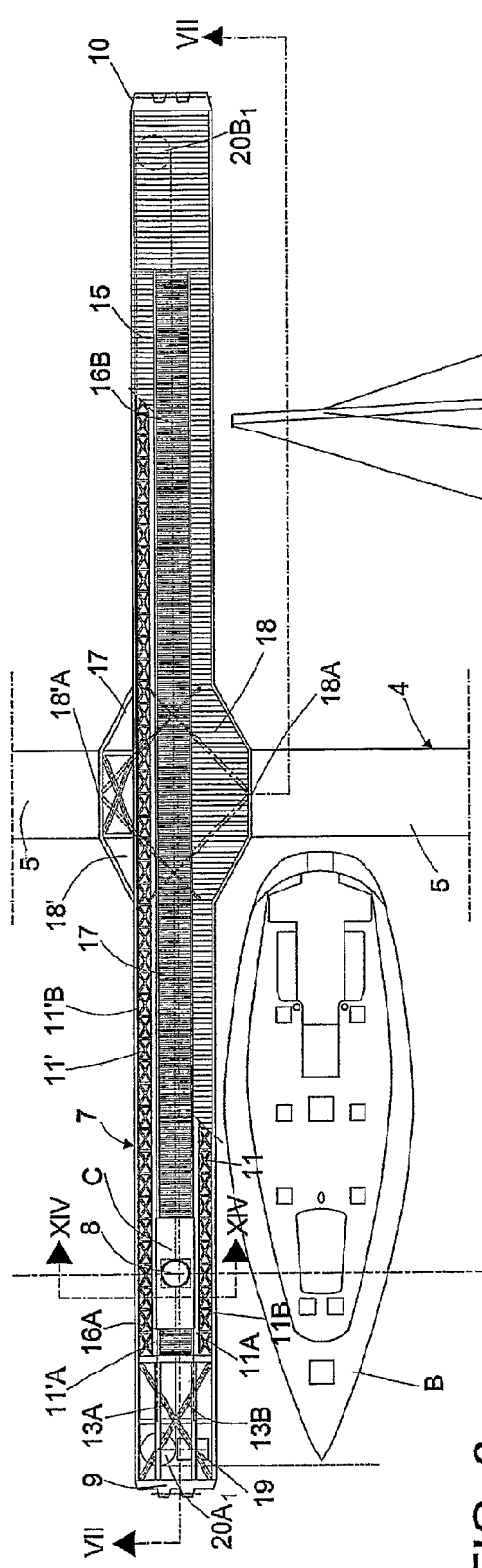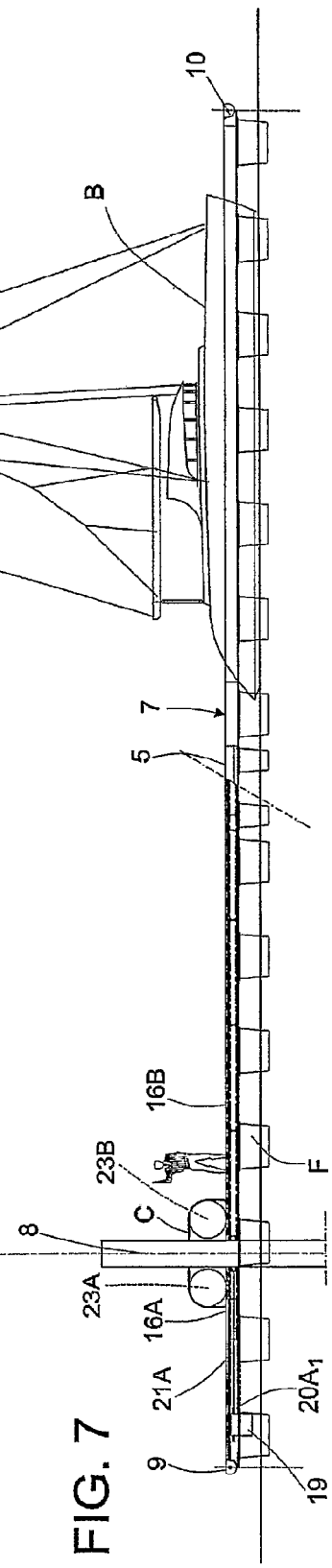
FIG. 6
FIG. 7

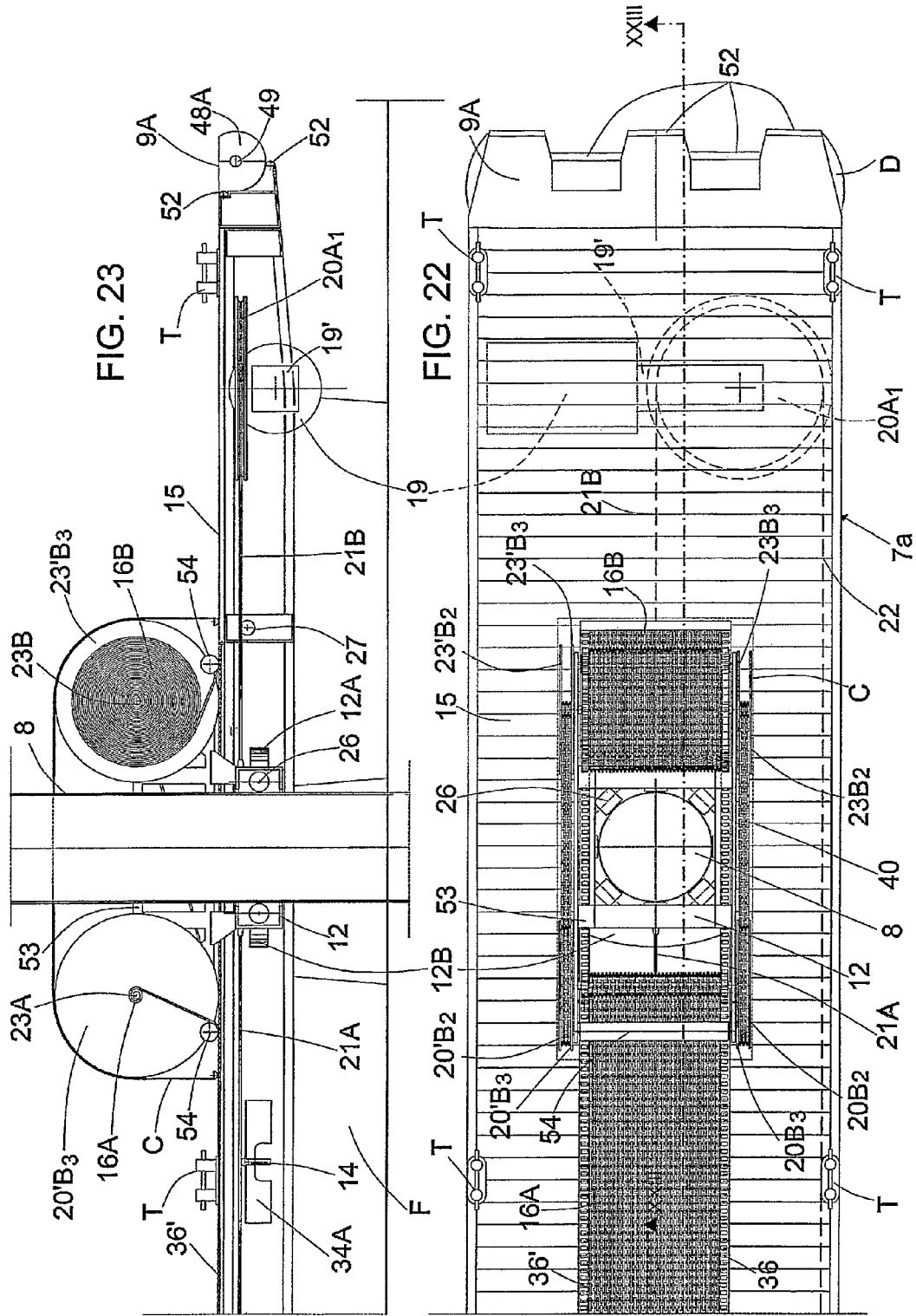

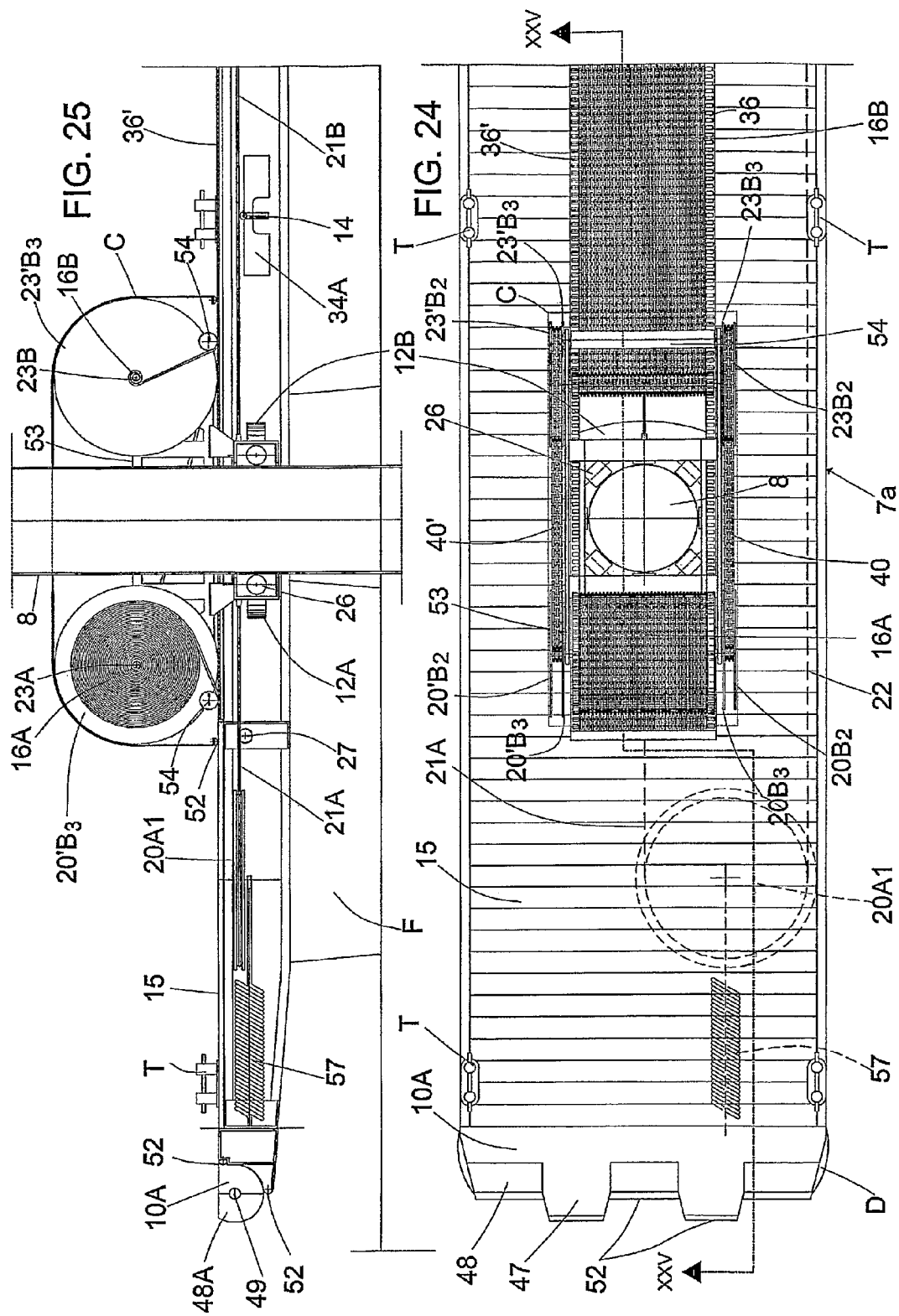

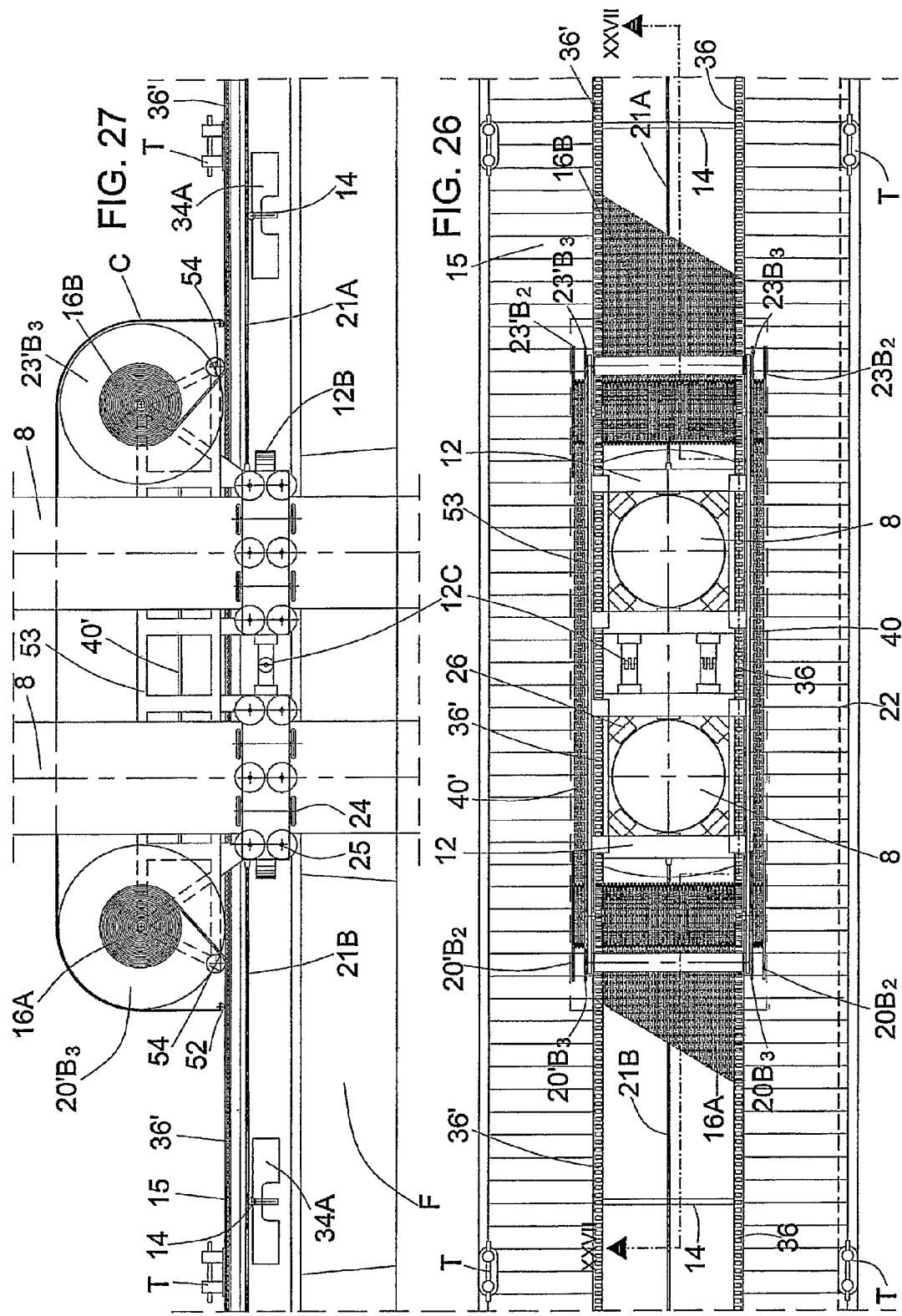

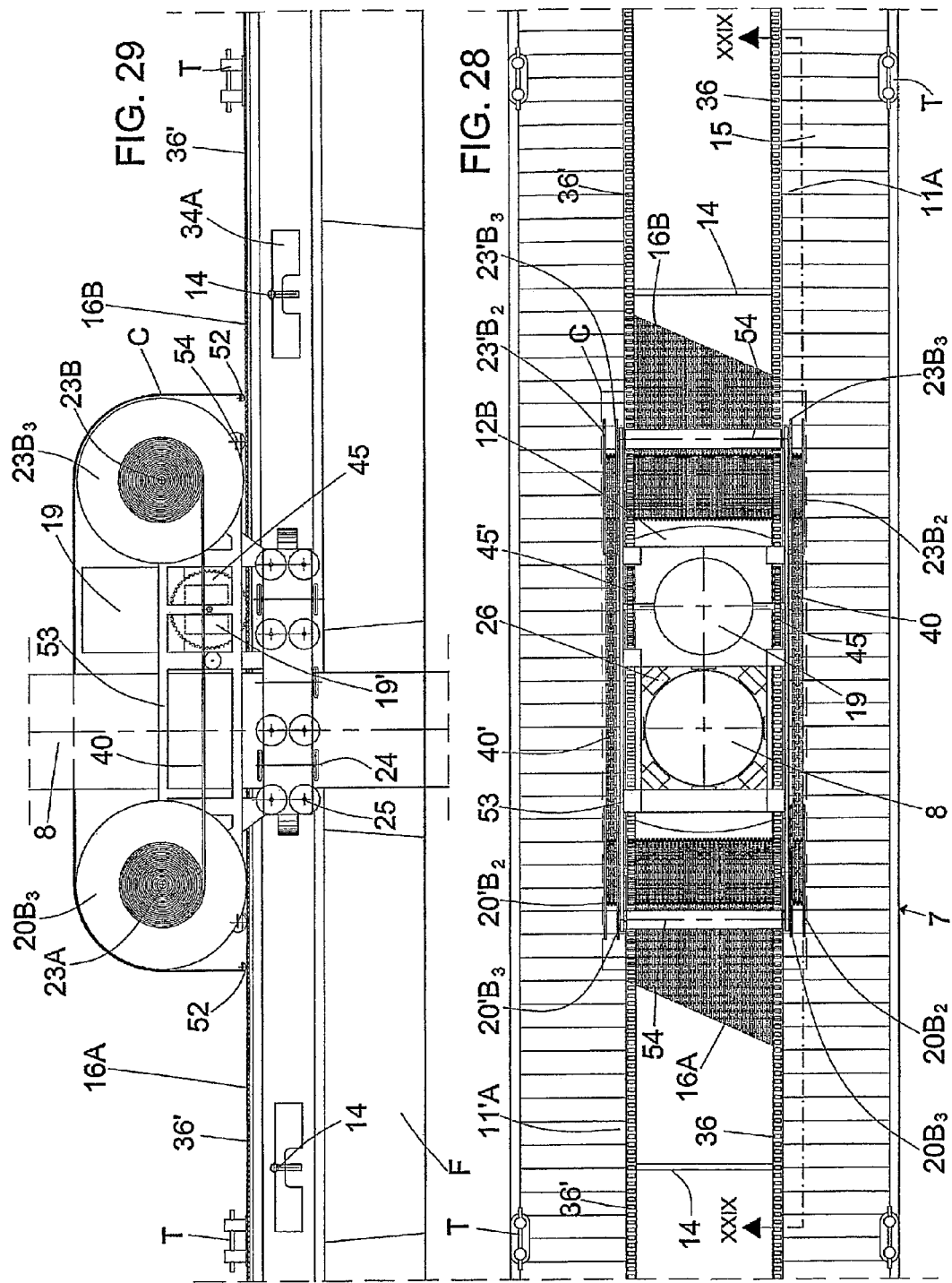

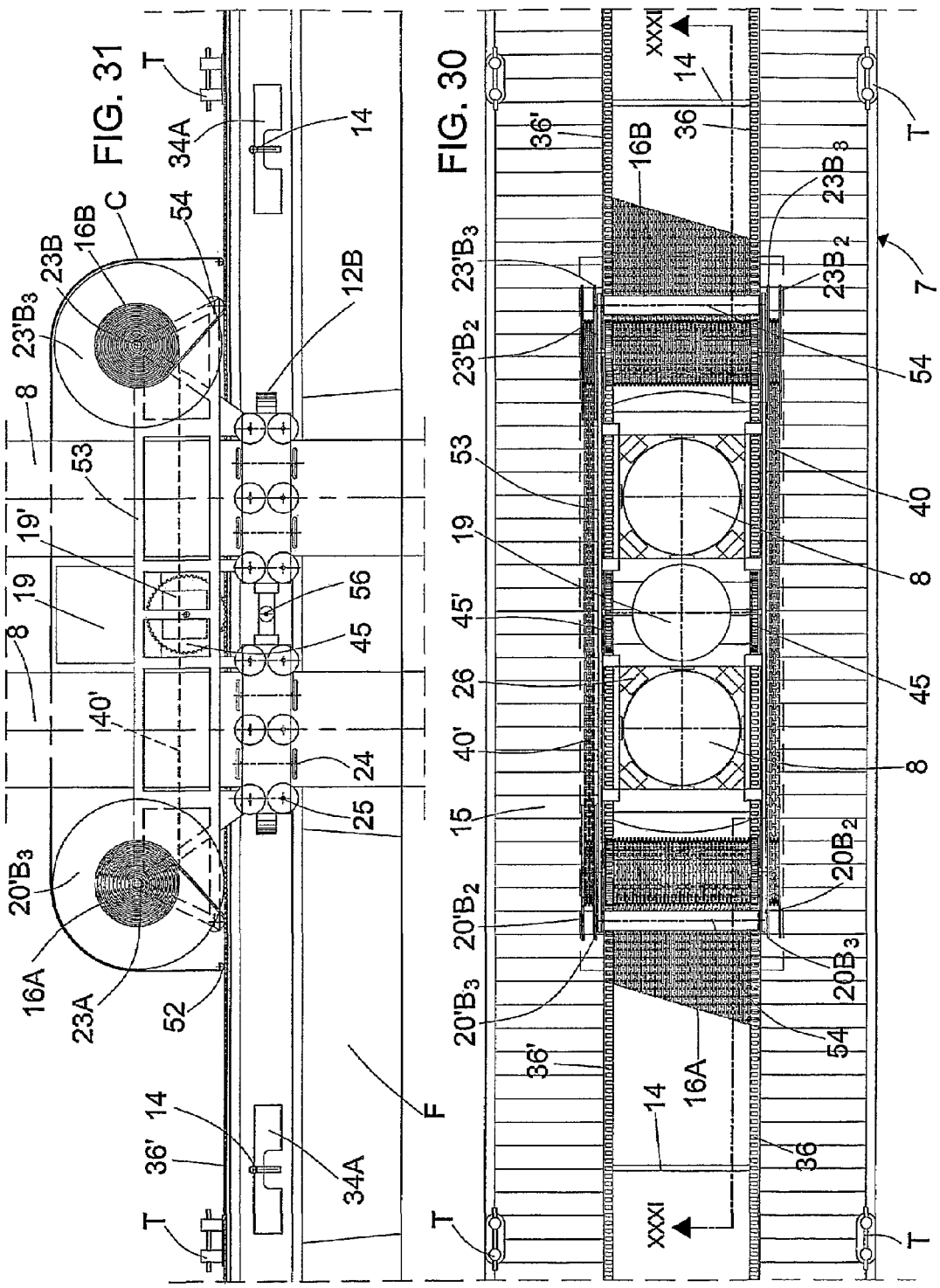

MOORING ARRANGEMENT PROVIDED WITH FLOATING MOBILE SYSTEMS FOR MOVING BOOMS

The present invention relates to the field of floating pontoons used especially to moor boats and floating vessels or crafts, in particular for pleasure sailboats or motor boats, in seaports, river ports, navigable waterways, etc.

The considerable development of pleasure sailing in the last decades, in France and other developed countries, led to a saturation of marinas, and consequently to unbearable waiting times for the users of public ports and to an increase in the mooring fees of private ports.

The increase in the number of ships and the increase of their average size, the development of large cruise catamarans, the use of which will not stop growing, will participate in the quick amplification of this saturation phenomenon, whereas the environmental awareness and the law for the protection of the coast-line reduce the opportunities to create new port locations.

In most cases, the afloat parking of sailboats or motor boats, in pleasure ports is done by way of mooring buoys or mooring arms and on booms consisting of several floating pontoons, by leaving each time an important open space between two rows of boats, in order to allow the exit and entry manoeuvres thereof. These indispensable manoeuvring areas are big space consumers (more than 40% of the areas of inner harbours) that cannot be assigned to the parking of boats.

GB-A-2 236 716 describes booms moving with respect to one or more fixed or floating piers, for example, using rack rails or other suitable means, some of which are underwater. These devices have never been exploited because of the impossibility to maintain booms of big length always perpendicular to the main piers by the means developed by GB-A-2 236 716 in view of the top hamper (rigging) with moored boats, of underwater guiding techniques described, quite unrealistic, due to corrosion problems. Mobile booms of this type are never stable.

The purpose of the present invention is to resolve these drawbacks. In this respect, it is provided floating mobile systems which act as mooring arms and between which are secured boom members. The displacement of these systems is coordinated with respect to the fixed points that are piles or dolphins driven into the bottom of the inner harbour, by dragging along the boom members and the boats that are moored to them, in order to have a single manoeuvring space for a set of several booms.

The present invention relates thus first to an arrangement of motorised floating mobile systems for moving mooring booms of boats B and floating vessels in inner harbours P, in order to translationally move said booms along a trajectory perpendicular thereto, in such a way that a manoeuvring space of boats B and floating vessels can be provided between at least two adjacent booms, whereas the other spaces between booms are closed for manoeuvring, each system including:
  means for fixing booms or sections thereof, which are disposed in a perpendicular direction to the translation direction;
  means which are arranged on the two ends of the system and enable said system to be attached to an identical system in the front thereof or to an attaching means arranged on the end of a pier or a fixed boom;
  means for translationally guiding in a direction parallel to a pier or a main pontoon, with respect to a fixed point consisting of a pile or dolphin or group of piles or dolphins driven into the bottom of the inner harbour, said fixed points of said arrangement being provided to be positioned following a regular grid pattern whose axes are perpendicular and parallel to said pier or main pontoon and which has a mesh size suitable to allow the abovementioned manoeuvring of a boom or a group of adjacent booms attached by their ends, with some systems being able to be guided by a fixed pontoon; and
  means which translationally move the booms, said arrangement moring means being controlled by means for synchronously controlling said manoeuvring.

According to a particularly interesting feature of the present invention, the ends of the floating mobile systems support mooring means so as to form mooring arms.

Advantageously, the systems are disposed so that they are always, in a stop position, at one end, in abutment with a pile or dolphin and, at the other end, locked on the end of a facing identical system or on the end of a pontoon or fixed pier, the ends of said identical system or said fixed pontoon being themselves in abutment with another pile or dolphin.

The means provided for attaching and disconnecting two adjacent booms can be disposed to ensure a link adapted to withstand bad weather conditions and follow water movements and the tides.

The means for translationally guiding a floating mobile system can consist of a carriage surrounding a dolphin forming a slide able to go up and down along the dolphin to follow water movements or the tides, said carriage externally comprising rolling devices adapted to cooperate with rails of the floating mobile system.

Each floating mobile system can be driven by at least one cable connected to the carriage at both opposite edges thereof perpendicular to rails, and likely to be drawn by a motor so that the traction of a cable connected to one edge allows the floating mobile structure to slide in the direction opposite to the traction exerted by the cable.

According to another possible embodiment, a motor embedded on the carriage puts in motion one or more of the toothed wheels which move on one or two rack rails, so that this movement involves the displacement of the floating mobile system in one direction or in the other.

According to a particular embodiment, a floating mobile system includes an elongated support structure with two facing beams carrying internally the rails provided to cooperate with the rolling devices of the carriage of the dolphin, said beams being joined at their ends by bonding structures, said beams and, when applicable, the bonding structures, being supported by at least one flotation device, means being supported by said beams allowing their connection to the boom or boom sections, with possible reinforcement uprightly from said connection by triangulation rams, the ends of said structure having complementary attaching means to means supported by the structure of the adjacent floating mobile system, in order to constitute trains of floating mobile systems in the attached positions of the systems concerned.

According to a first alternative, the two spaces between the two rails from either side of the carriage associated with the dolphin can be closed by a grating which winds and unwinds from either side of the carriage depending on the displacement of the floating mobile system with respect to the dolphin, a flooring allowing the users float traffic covering the structure around the grating.

Some means can be advantageously provided to allow the winding or the unwinding of one of the gratings at a speed depending on the unwinding or winding of the other grating.

Such means of winding/unwinding of a grating with respect to the other one can consist of at least a chain whose length and thickness are proportional respectively to the length and thickness of the windable grating and mounted to wind around the winding axis of the first grating in a direction opposite to the winding direction thereof and on the parallel axis of the second grating also in the direction opposite to the winding direction thereof, so that when the first grating is fully wound on its axis, the chain is completely unwound on this same axis and is completely wound on said second axis, whereas the second grating is completely unwound, said chain being driven by the unwinding of the first grating, itself driven by the motor moving the structure.

According to a second alternative, the protection of the central opening of the systems can be provided by a guardrail positioned around the translation area of the dolphin, a passage area in the axis of the boom sections being arranged thanks to a liftable walkway.

On the other hand, between the two rails of a floating mobile system can be disposed maintaining braces, said braces being arranged to disappear when the displacement of the structure leads them in the vicinity of the carriage edge and being adapted to be used as support to a traction cable.

According to another possible feature of the present invention, each boom comprises several mooring pontoon sections connected to the floating mobile systems, being completed by a floating mobile system, named pier system, adapted to slide along a conventional fixed floating pontoon and by a floating mobile system, named head system (207a, 207b, 207c, 207d), located at the opposite end of the boom, on the boat access side, and being adapted to be used as a waiting pontoon.

Also, the connection between the booms or booms sections and the mobile systems can be performed at a level selected to allow, on either side of the boom, two equal or different lengths, depending on the needs, of location for boats B and floating vessels.

According to another particular feature, each fixed point is formed by several dolphins whose associated carriages are connected by a hinged bonding device.

The present invention also relates to a port installation comprising booms adapted to move by the arrangement of motorised floating mobile systems such as defined above.

The system of the present invention thereby ensures a perpendicular displacement of mooring booms by simple and non-immersed means.

In order to illustrate better the object of the present invention, several embodiments will be described below with reference to the appended drawings, on which:

FIGS. 1 and 2 are schematic top views of an inner harbour whose booms are equipped with floating mobile drive systems adapted to drive them, in order to move them in a parallel direction to themselves on the water surface, FIG. 1 showing all the mobile booms closed except the first bay between a fixed boom and the first mobile boom; and FIG. 2 showing a situation in which booms have been moved to provide a manoeuvring area between two other mobile booms;

FIGS. 3 to 5 are top views at a bigger scale of one of the floating mobile systems of a boom in three respective positions, namely the two limit positions and an intermediate position with respect to an associated dolphin;

FIG. 6 is a top view at a bigger scale of one of the floating mobile systems, with a boat moored on the left, said system including drive means according to a first embodiment, by cable and pulleys, and using a central system of longitudinal gratings retractable by winding;

FIG. 7 is a side view of the floating mobile system of FIG. 6, with a boat moored on the right, whose right part is shown in elevation, and the left part in cross section according to the VII-VII line of FIG. 6;

FIGS. 22 and 24 are top views of the end regions of the floating mobile system according to the first precited embodiment, in the two respective limit positions of its displacement;

FIGS. 23 and 25 are cross-section side views according to XXIII-XXIII of FIG. 22 and according to XXV-XXV of FIG. 24 respectively;

FIG. 26 is a partial view of a floating mobile system according to an alternative of the first embodiment, adapted to cooperate with two dolphins instead of one, the floating mobile system being shown in a central intermediate position of its displacement;

FIG. 27 is a cross-section side view according to XXVII-XXVII of FIG. 26;

FIG. 28 is a view similar to FIG. 26, but with a single dolphin and showing a floating mobile system comprising driving means according to a second embodiment by rack-rails and toothed wheels with a motor embedded on the carriage;

FIG. 29 is a cross-section side view according to XXIX-XXIX of FIG. 28;

FIG. 30 is a view similar to FIG. 28, showing a floating mobile system according to an alternative of the second precited embodiment, adapted to cooperate with two dolphins instead of one;

FIG. 31 is a cross-section side view according to XXXI-XXXI of FIG. 30;

Figure 1:
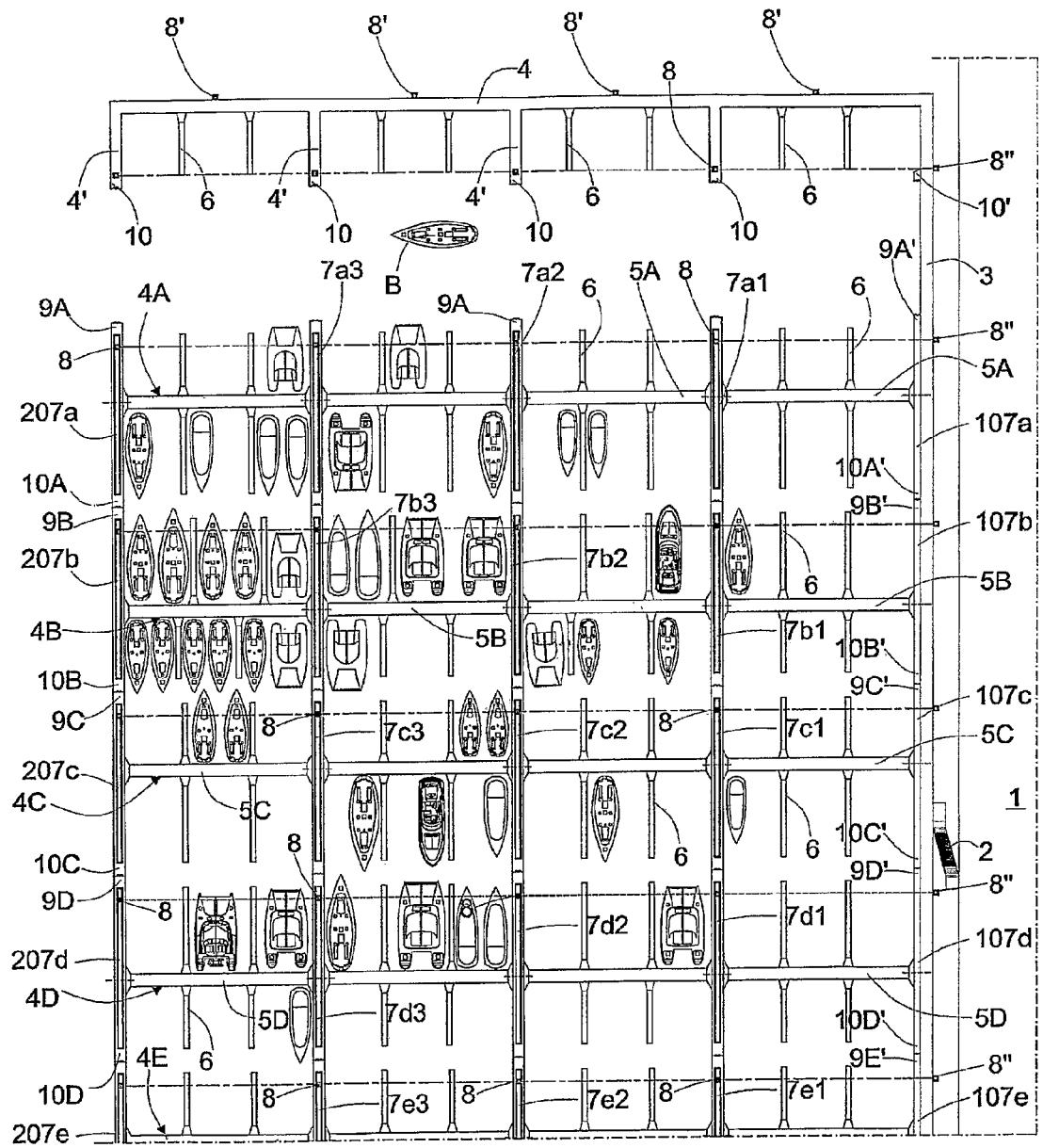

In the specification and in the drawings, some of the reference numerals are followed by letters a, b, c, etc . . . , A, B, C, etc . . . or by "'", "''", because they designate identical parts or elements on different booms or they are symmetrical with respect to the average longitudinal line of the floating mobile systems of the invention. In order to clarify, we have sometimes used these reference numerals without their associated letters or signs.

Figure 2:
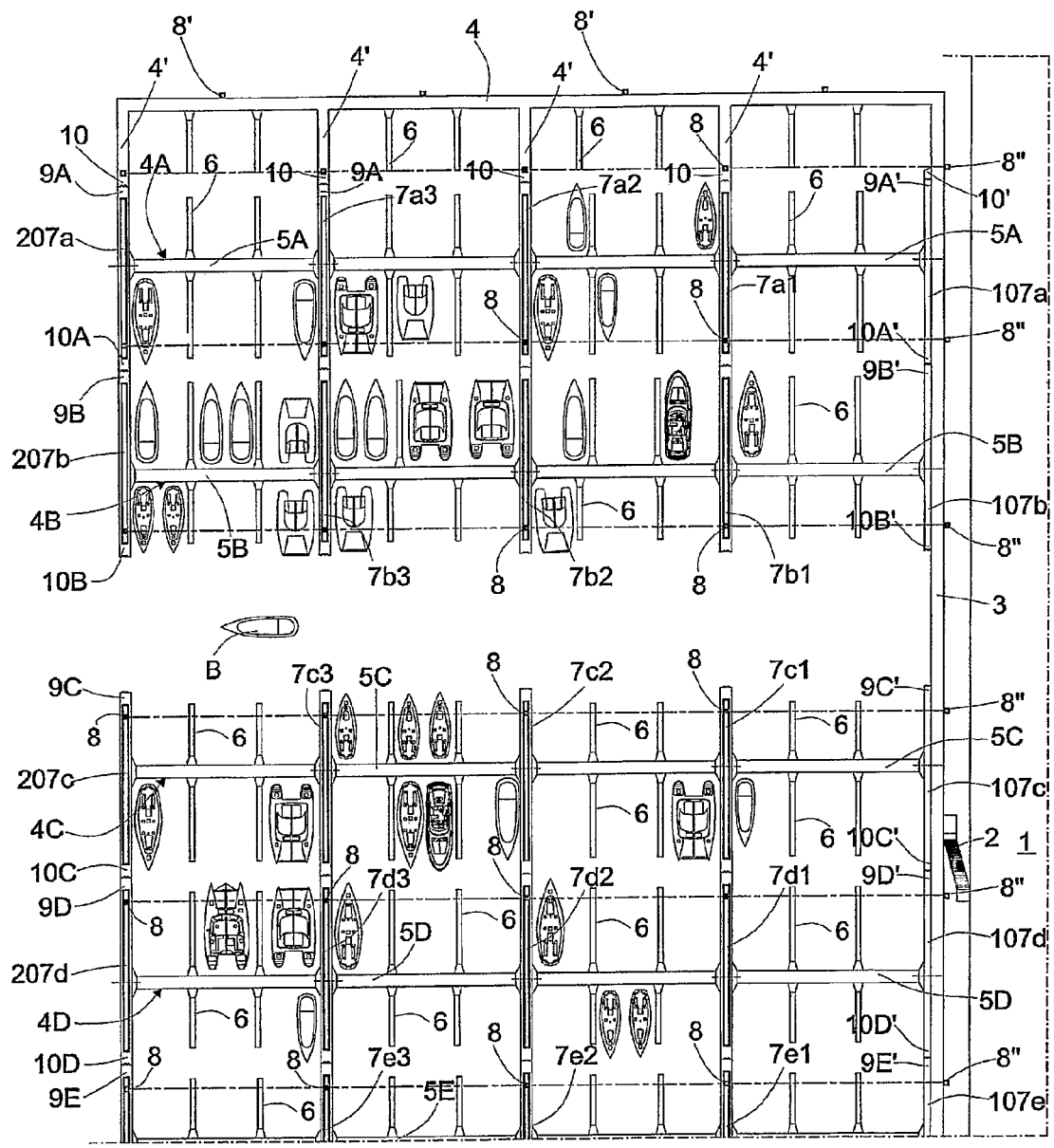

The inner harbour as represented in FIGS. 1 and 2 includes a conventional fixed pier 1, connected by a walkway 2 to a floating pontoon 3, referred to as fixed one, going up and down in a conventional way depending on the tides. The pontoon 3 is parallel to pier 1 and includes, at an end perpendicular to the pier 1, a fixed boom 4, internally presenting inward returns forming mooring arms 4' and between these arms, smaller mooring arms called "catways" 6.

Opposite to the pontoon 4, will be a fixed pier or floating pontoon referred to as a fixed one of the same type, which has not be shown in FIGS. 1 and 2, which illustrate a part only of the inner harbour. These fixed parts are provided to allow a support of the booms 4 in their stop end positions, whatever the bay which is opened for the passage of boats B.

The floating pontoon 3 allows the access to the successive mobile booms 4A, 4B, 4C, 4D, which are perpendicular to this floating pontoon, the boom 4A being disposed in the vicinity of the fixed boom 4 in return from the floating pontoon 3. Thereby, the booms 4A to 4D go up and down with the tides simultaneously with the floating pontoon 3 and the boom 4. However, unlike the conventional booms, such as the boom 4, these booms 4A to 4D are able to move in an horizontal plane, always remaining perpendicular to the pontoon 3 parallel to fixed pier 1. The same also serves as an auxiliary guide to said booms 4A to 4D, as will be described below.

On the drawing, are represented four of these mobile booms and, partially, a fifth one. The boom number will depend on the length of pier 1. Practically, the best compromise between the boom number and the waiting times generated by the opening and the closing of the several manoeuvring areas and the boats manoeuvring times will be sought.

Each boom 4A to 4D consists of an alignment, perpendicular to the branch parallel to the pier 1 of the pontoon 3, of successive mooring pontoon sections, 5A to 5D respectively; there are four pontoon sections forming a boom in the example represented.

On either side of each boom sections 5A to 5D, are disposed side mooring arms necessary to moor the boats, of the "catway" type all referred with the same reference numeral 6. The "catways" number and length depend on the boat size. Since they are conventional, they will be not described in greater details herein. These "catways" are positioned according to the length of the boats concerned, two boats being conventionally moored on both sides of a "catway".

Thereby, in the example represented, catways located from one side of a boom are longer than those located on the other side. The organization of the catways is conventional for a harbour chief. However, herein, the length of the catways will always have to be lower than the one of the neighbouring part of the floating mobile systems of the invention.

Floating mobile systems 7a1, 7a2, 7a3 ; 7b1, 7b2, 7b3 ; 7c1, 7c2, 7c3 ; 7d1, 7d2, 7d3 ; 7e1, 7e2, 7e3 (generally referred to as 7a, 7b, 7c or by 7) are disposed between the mooring pontoon sections respectively 5A, 5B, 5C, 5D, of a boom 4A, 4B, 4C, 4D, perpendicularly to the alignment of the boom sections. They are facing the main mooring arms 4' of the fixed boom 4 and also constitute mooring arms. These systems cooperate between them and are guided as will be described more in detail below, by a pile or a dolphin 8, driven in a conventional way vertically into the bottom of the inner harbour. The fixed boom 4 is held in a conventional way by dolphins, also referenced 8, located externally with respect to the inner harbour constituted thereby. Likewise, the mooring arms 4' are like the pontoon 3 and the boom 4 adapted to go up and down depending on the tides movement along the dolphins 8 located at their ends. The dolphins 8 are disposed according to a gridding of a four sided mesh, this disposition being necessary for the alignment of the systems 7 of the arrangement (as well as with the arms 4') perpendicularly to the booms 4, as well as for the closing of the booms 4.

The systems 7 of the invention can have a length of about 30 meters.

On the other hand, each end of the booms 4A, 4B, 4C, 4D is guided along the conventional fixed pontoon 3 by a mooring floating mobile system referred to as a "pier system", 107a, 107b, 107c, 107d respectively, the end of the first mooring floating pontoon sections 5A, 5B, 5C, 5D, etc. being perpendicular to it. The systems 107 will be described in greater detail below with reference to FIGS. 36 to 38.

At the opposite end of each boom 4A to 4D, 4E, etc. of the mooring floating arrangement constituted thereby, i.e. on the side of the entry and exit of the boats, can be found a mooring floating mobile system referred to as a "head system", 207a, 207b, 207c, 207d, 207e respectively, which cooperates with the arrangement and is also guided by a dolphin 8, connected by one side only to the last mooring pontoon section 5A to 5D, 5E, etc respectively.

The floating mobile systems 7a to 7e; 107a to 107e; 207a to 207e, in addition to being arranged to drive the booms 4A to 4E as described more in detail thereafter, also serve, as already indicated, as a mooring arm, on one side only for the systems referred to as pier systems 107a to 107e etc. and on both sides for the intermediate systems 7a to 7e, etc. and for the head systems 207a to 207e, etc. The boats arriving in the inner harbour will thereby be able, if necessary, to moor temporarily on the external side of the latter (waiting locations).

All the floating mobile systems, the "pier" ones, the "intermediate" ones and the "head" ones, are connected in their central part to their respective mooring pontoon section. The height (freeboard) of these systems with respect to the water level is advantageously adaptable to the one of the existing pontoons.

All these systems, apart from "pier" pontoons comprise each a longitudinal opening crossed by a dolphin 8. They move along their longitudinal axis between a position where the dolphin 8 is at an end of the opening and another position where it is at the other end. The two male and female external ends, of a floating system are referenced 9A, 10A; 9B, 10B; 9C, 10C; 9D, 10D respectively for each system 7a, 7b, 7c, 7d, etc.

The "catway" mooring arms 6 are shorter than the halves of the systems 7a to 7e, etc.; 107a to 107e, etc; 207a to 207e, etc, which are all of equal length. The latter are indeed provided to cooperate with each other by their ends 9B, 10A; 9C, 10B; 10C, 9D, to form mobile system trains parallel to the pier 1 (FIGS. 1 and 2). Likewise, the ends 9A will cooperate with the mooring arm ends 4', provided with means 10 similar to means 10A, 10B, etc. in order to strengthen the arrangement cohesion and to withstand bad weather conditions.

The ends of the "pier" mobile systems are also provided with male/female attaching means 9A', 9B', etc, 10A', 10B', etc; the end 9A' of the first element 107a coming in abutment with a attaching piece of the same type 10' supported by the fixed pontoon 3.

In the represented example (FIGS. 1 and 2), the spaces reserved for the boats are of different sizes on either side of the booms. It is obvious that spaces of equal lengths could be provided. The locations for boats of different categories can thereby be organized as desired. The catways 6 located at these locations are of different lengths for the same reasons.

In FIG. 1, the booms 4A to 4D are in their closed position, secured one to another by the facing ends of the different floating mobile systems 7. Only one side of the boom 4 is open. In FIG. 2, the space between the booms 4B and 4C is open. Boats can thereby manoeuvre depending on the case in the space between the fixed boom 4 (FIG. 1) and the boom 4A, and between the booms 4B and 4C (FIG. 2).

In all the cases, the ends 9 or 10 of the mobile systems, in open position, are in abutment with a dolphin, making the arrangement dimensionally stable, even during bad atmospheric conditions, the other system end being attached to its opposite, which is itself in abutment with a dolphin.

In FIGS. 3 to 5 is represented, viewed from the top, a floating mobile system (7b of the boom 4B) of FIGS. 1 and 2 in three different positions with respect to its associated dolphin 8.

The structure of this system 7b—which is the same for the other systems 7a, 7c and 7d, etc—will now be described with reference to FIG. 8.

The mobile system 7 consists of two metal beams 11 et 11', parallel to each other and arranged spaced apart, to allow for the passage of the associated dolphin 8 and of a carriage 12 surrounding the latter, whose function is described thereafter. Each beam is formed with two parallel profiles 11A, 11B; 11'A, 11'B of rectangular section, joined by strainers 11C. The internal profile (11A; 11'A) of each of the beams, presents on its free side face, turned towards the other, a partially closed opening, so that it consists of a rail (referenced as 11A; 11'A).

The external profiles 11B, 11'B support in several locations moorings cleats T for boats, as well as side protection fenders D.

Each floating mobile system 7 comprises floats F under the beams 11, 11', on each side of the space allowing the passage of the dolphin 8 during the displacement of said system (of the catamaran type). These floats F have the shape of conventional blocks (foam injected in a plastic shell). They can also be of the inflatable bulge or pudding type F1 such as those shown in FIG. 14. In this case, they advantageously protrude from the system 7 structure to possibly absorb the shocks caused by the boats.

In order to stiffen each floating mobile system 7, metal stiffener structures 13A, 13B (FIGS. 3 to 6) are disposed at its ends 9 and 10, and, as we can also see it among others in FIG. 10, some braces 14 extend from a rail 11A to another (11'A), these braces 14 being retractable by swivelling in the rail as it will be described thereafter.

Apart from the space located between the rails 11A and 11'A, the system 7 is covered with a flooring 15 of conventional type in the nautical field.

On the other hand, between the rails 11A and 11'A, and from both parts of the carriage 12 surrounding the dolphin 8, the space is, especially for users' safety, closed by a grating 16A that may be unrolled (on the left of the carriage 12 when looking at FIGS. 3 to 5 and 16B, on the right) which winds and unwinds (as it will be described thereafter) from both sides of the dolphin 8 depending on the system 7 displacement with respect to the dolphin. This winding/unwinding is such that the central space of the system 7 is always covered (apart from the space occupied by the carriage 12) by a grating allowing the user's passage.

To consolidate the junction between the floating mobile system 7b and a boom section 5, a stiffener 18 and 18' is also provided, of trapezoidal shape, which comes to enlarge the system 7 at this junction.

Figure 9:
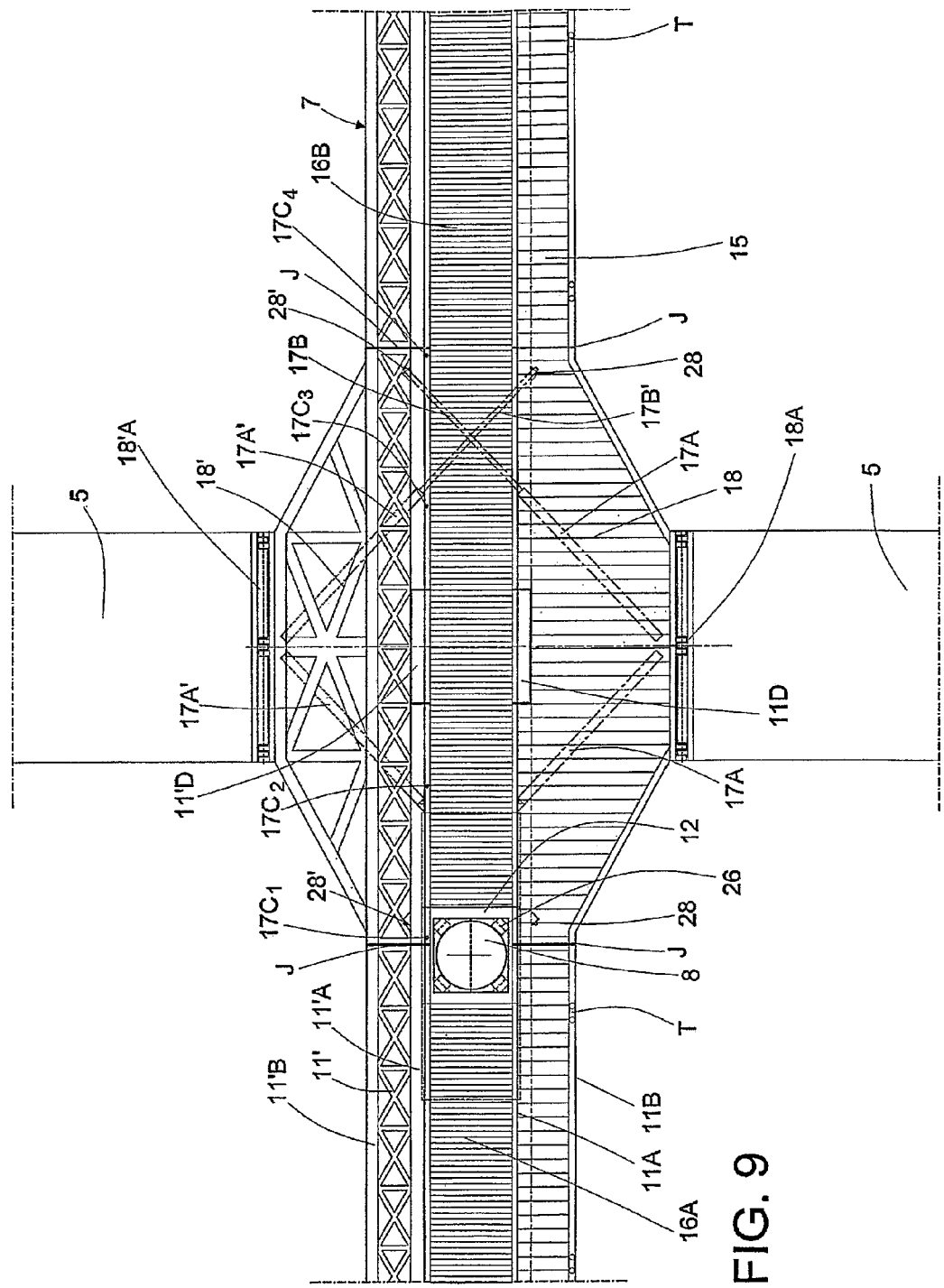
FIG. 9 shows at a bigger scale the central junction area of the floating mobile system of FIG. 6 with two mooring boom sections forming the boom, located from either side of the boom, the floating mobile system having moved towards the right with respect to the associated dolphin.

The floating mobile system 7 is adapted to the two mooring boom sections 5 on either side thereof by a attaching system 18A, 18'A respectively, which is supported by the external free edges of the stiffeners 18 and 18' and that can be better seen in FIG. 9, being for instance a fixture of the ears on pivot type, allowing, on one hand an adaptation to the different kinds of commonly manufactured pontoons, and, on the other hand, a slight movement about the horizontal axis of the link 18A, 18'A to fit to the water movements.

The under-face of platforms 18, 18' is provided with horizontal triangulation rams 17 whose cylinders are referenced by 17A, 17A' and the rod-pistons, by 17B, 17B', the cylinders 17A, 17A' being secured by any means to the associated platform, each inside the trapezium.

In extracted position, the piston rods take positions such as represented on the right-hand side of FIG. 9, forming thus reinforcement arms, their ends coming to lock in blind holes 28, 28', provided for this purpose in the opposite rail.

Along the rail 11'A, are provided sensors $17C_1$, $17C_2$, $17C_3$, $17C_4$, the sensors $17C_1$ and $17C_2$, being located on either side of the meeting point of the exit rods 17B located on the left-hand side in FIG. 9, and the sensors $17C_3$ and $17C_4$ being located on either side of the meeting point of the exit rods 17B located on the right-hand side.

When the carriage 12 is in contact with the followers $17C_1$ or $17C_4$, according the direction of the system displacement, the rods 17B of the rams 17 shrink to let the passage of the carriage and extend again during the contact with the carriage 12 with the sensors $17C_2$ or $17C_3$, according to the direction of the system displacement, after the carriage passage.

It is also possible to foresee that the floating mobile systems be designed in three modular parts, i.e. a central part including the trapezoidal stiffeners and two identical side parts, whose lengths can be different, with the ends including appropriate male and female attaching parts. The junctions of this central part and the side parts have been symbolized by the letter J in FIG. 9 among others. Such junctions should especially be of the type of the junctions 18A and 18'A.

During the arrangement of system 7, the left and right parts of the system are assembled to the central part, which are separated to be transported between the manufacturing place and the inner harbour. The central part 11D, 11'D of rails 11A and 11'A is removable in order to allow the carriage 12 installation and its maintenance (see also FIG. 13).

In the position of FIG. 3, the female end 10B of the system 7b is secured to the male end 9C of the system 7c and the dolphin 8 is in abutment with the system 7b in the vicinity of its male end 9B, the grating 16A being wound, and the grating 16B, unwound to the maximum extent, the passage being open between the booms 4A and 4B. In the position of FIG. 4, the system 7b is moving and its ends 9B and 10B are free, the gratings 16A and 16B being partially wound (or unwound). In the position of FIG. 5, the end 9B of the system 7b is secured to the end 10A of the adjacent system 7a, the gratings 16A, 16B being in their opposite positions with respect to the one of FIG. 3 and the passage being thereby open between the booms 4B and 4C.

The carriage 12 of a floating mobile system 7 surrounding its dolphin 8 guides said system 7 by cooperating with the rails 11A and 11'A.

The central upper part 11D, 11'D of track-rails 11A and 11'A (FIGS. 9 and 13) is advantageously rotatably mounted in order to allow the opening of the latter when a maintenance of the carriage 12 has to be performed.

The carriage 12 consists of a metal profile square frame comprising, on the sides facing the rails 11A and 11'A, horizontal 24 and vertical 25 side rolling systems, allowing it to move inside the rails 11A and 11'A while maintaining a constant spacing of the latter.

In each of the four inner angles of the carriage 12 and at the center of the four sides thereof, horizontal bearing rollers 26 allow the carriage to slide freely vertically along the dolphin 8 in order to conventionally follow the movement of tides. The rollers 26 are mounted on springs 26', which allows the absorption of the side movements of the carriage 12 around the dolphin 8 and the absorption of the implementation tolerances of the dolphins.

Figure 18:
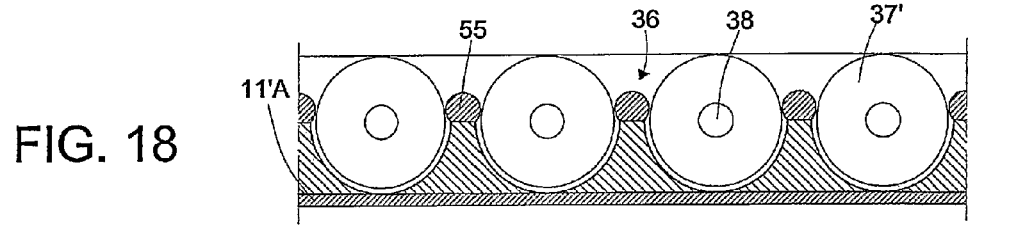
FIG. 18 is an enlarged view L of the detail of FIG. 17 of the grating clipping system on one of the two rack-rails of the floating mobile system.
Figure 19:
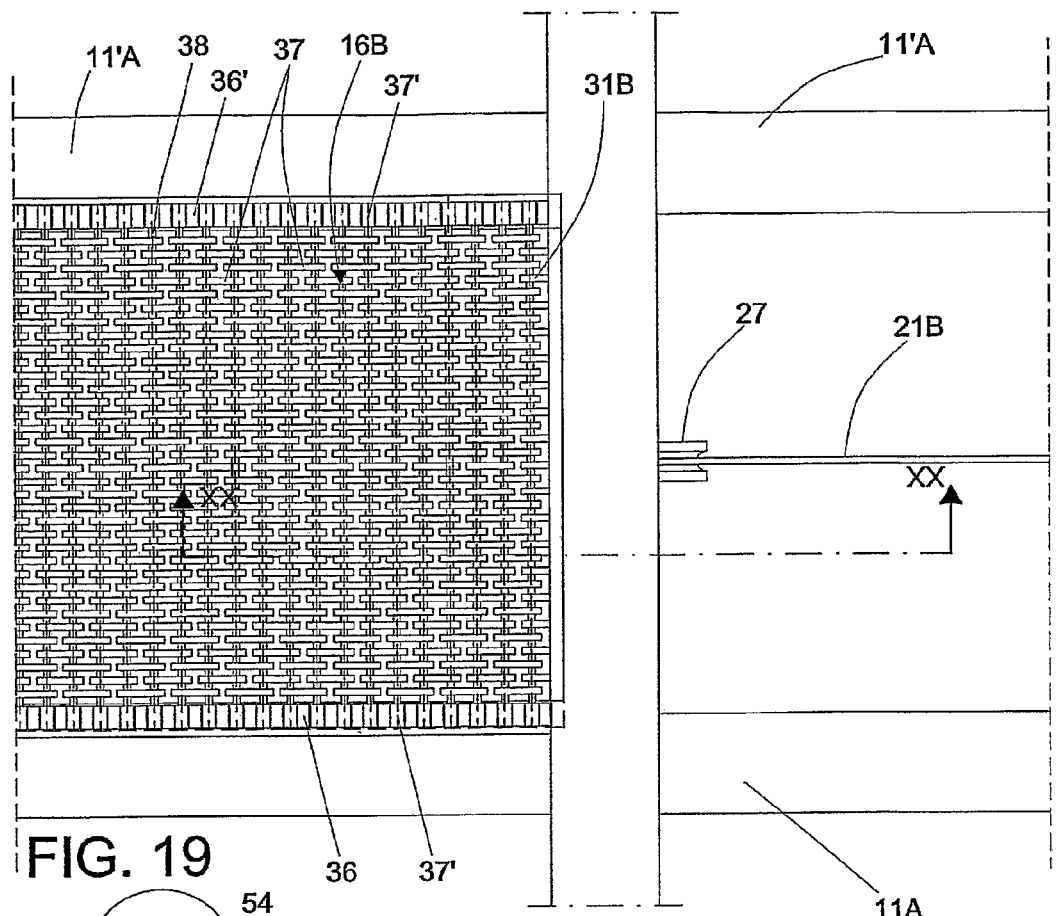
FIG. 19 is a top view, at a bigger scale, of an end of the floating mobile system in the grating junction area.

The carriage 12 externally supports in its upper part and on the rails side, a metal structure 53 which supports the winding axes 23A and 23B of the gratings 16A, 16B, said axes being disposed perpendicularly to the rails from either side of the carriage 12. The structure 53 also supports the axes of two rollers 54, used to clip the gratings 16A, 16B on clipping rack-rails 36, 36' disposed on the top of the rails 11A, 11'A. The successive teeth 55 of the clipping rack-rails can be better seen in FIG. 18. They maintain the grating in position.

Figure 21:
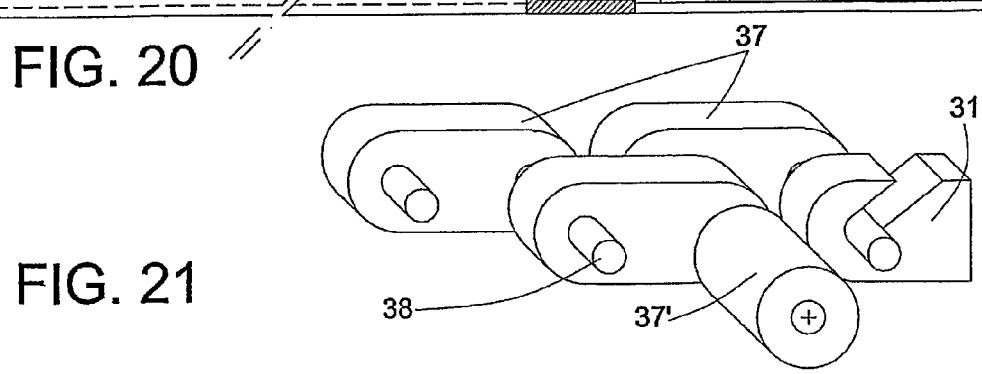
FIG. 21 is a perspective view of three elements constituting the grating, showing their embodiment and their hinging.

The gratings consist of a set of small elongated pieces 37 (FIG. 21), disposed depending on the length of rails 11A and 11'A. These pieces 37 are delimited by two opposite lateral faces, of an oblong shape, vertically disposed and in a staggered manner in the mounting position. Each piece 37 has two transverse drillings perpendicular to the oblong faces, the facing drillings being crossed by the axes 38. As such is made a belt conveyor of the caterpillar type. The ends of the axes 38 are provided with small clipping cylinder 37', that can be clipped in the rack-rails 36, 36'.

The carriage 12 has externally in the middle of its edges perpendicular to the rails and in upper part, a jaw 30, 30', for example a fitting of Norseman type, taking a cable 21 (whose two stands coming from the carriage are referenced by 21A, 21B), which passes on pulleys $20A_1$, $20B_1$, with a vertical axis, (drive pulley $20A_1$ and free pulley $20B_1$), located under the flooring 15 in the vicinity of the respective ends of the system 7.

In FIGS. 22 and 23, it can be seen that the pulley $20A_1$ is driven by a motor/reducer 19/19' arrangement, and in FIGS. 24 and 25, we can see that the free pulley $20B_1$ is connected to a spring 57 to absorb the traction forces on the cable 21 driven by the pulleys.

Figure 13:
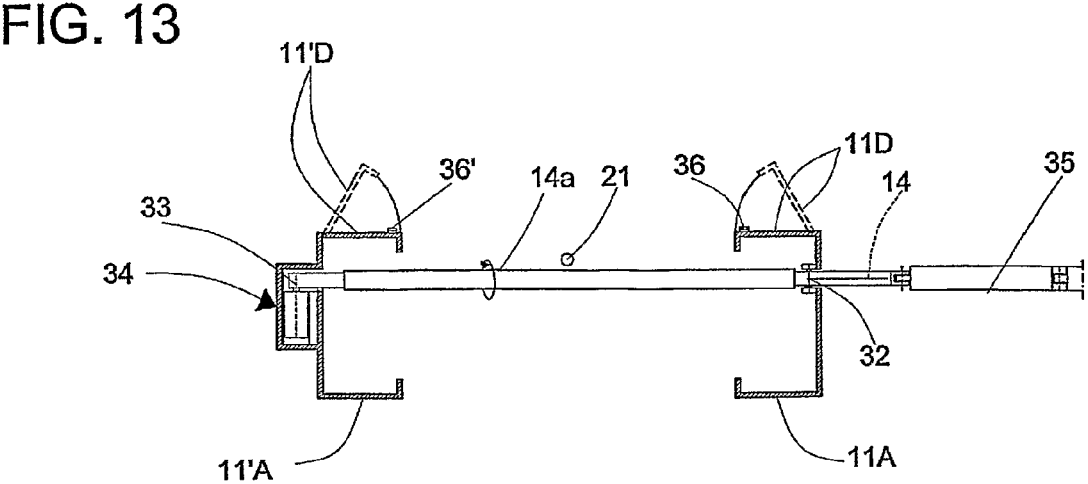
FIG. 13 is a cross-section view according to XIII-XIII of FIG. 12.
Figure 12:
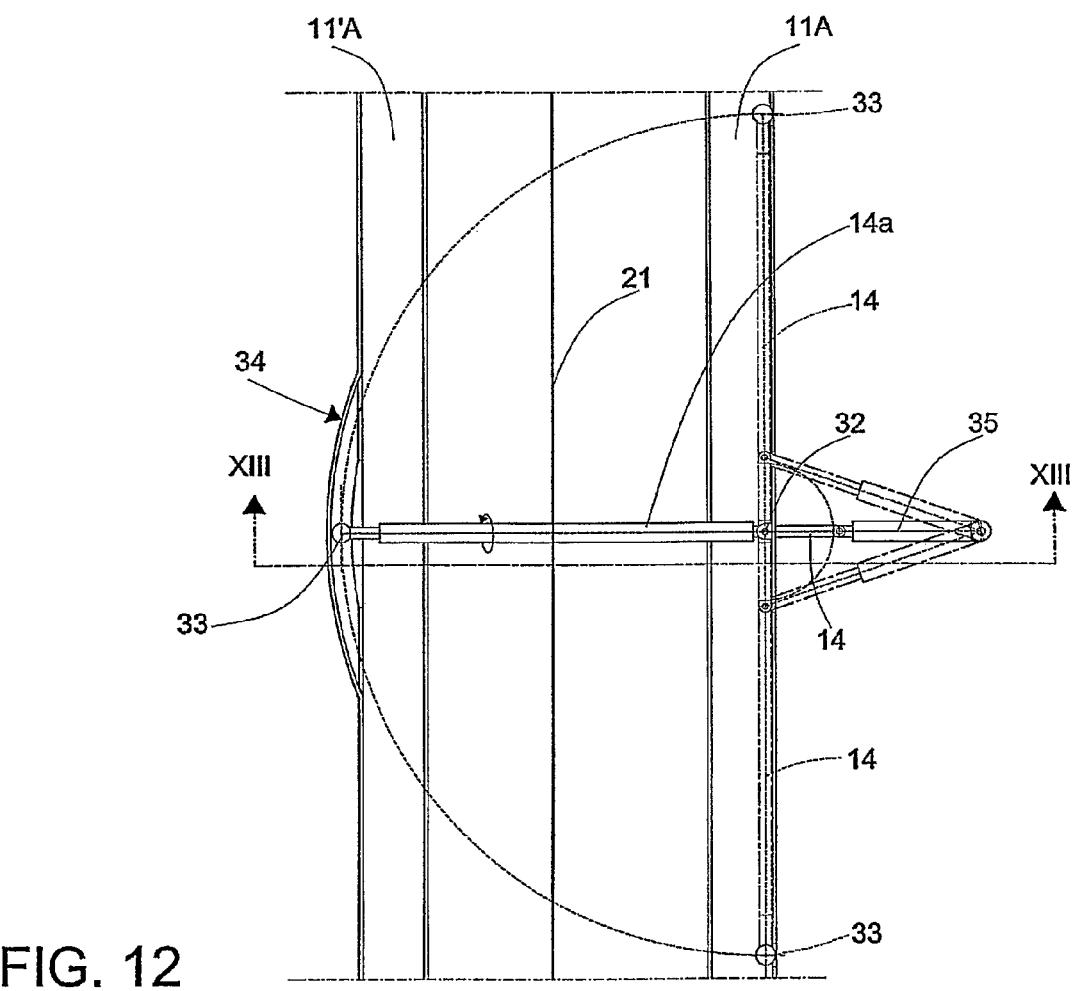
FIG. 12 is, at a bigger scale, a view of the left part of FIG. 10, turned at 90°, the boom flooring being removed in order to show the system sliding rails and the manoeuvring device of the gap maintaining brace of the system side rails, whose end positions are represented with a dot and dash line.
Figure 15:
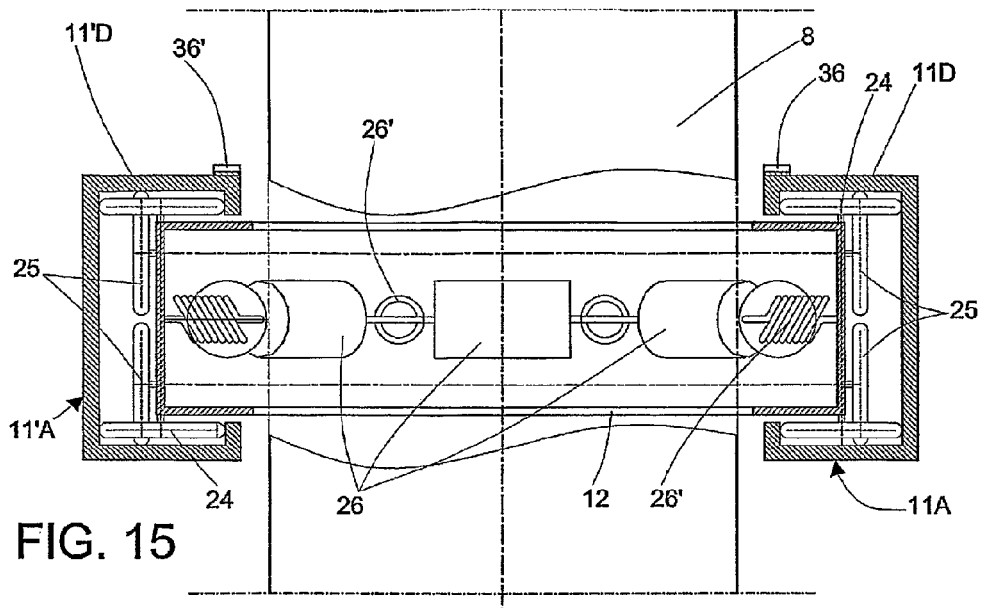
FIG. 15 is a cross-section view at a bigger scale of the carriage rails arrangement, according to XV-XV of FIG. 10.
Figure 14:
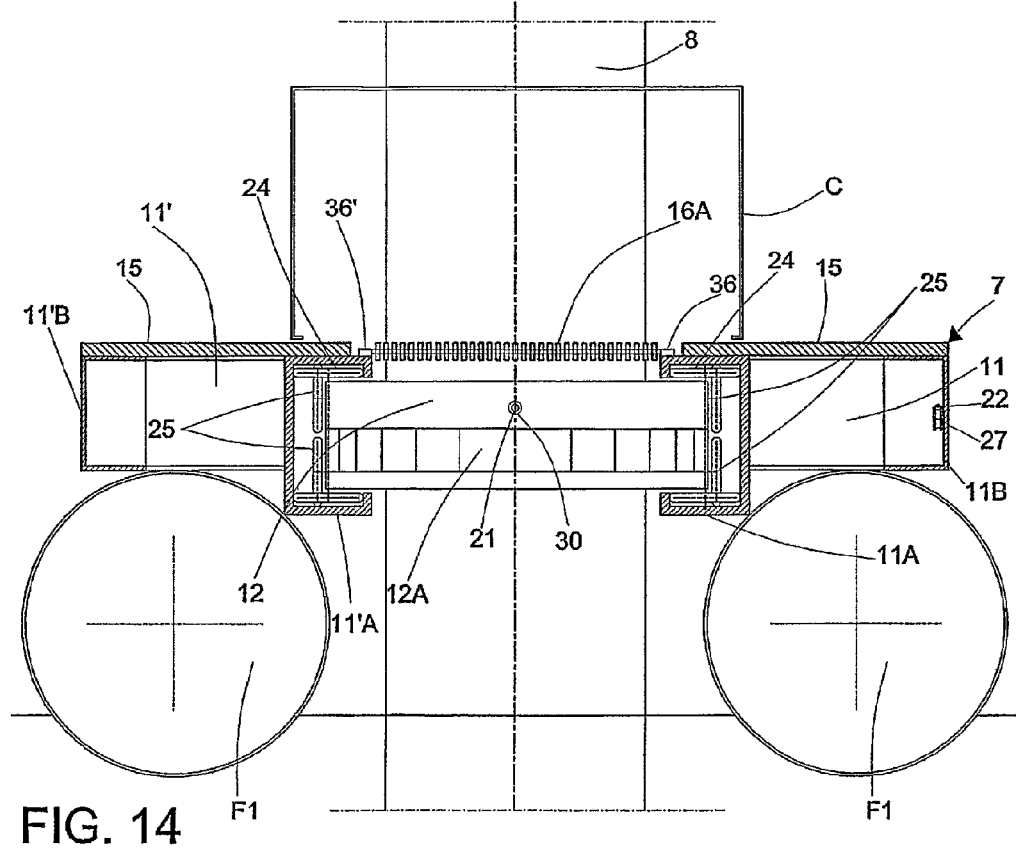
FIG. 14 is a transverse cross-section view according to XIV-XIV of FIG. 6, with floats of a different type.
Figure 16:
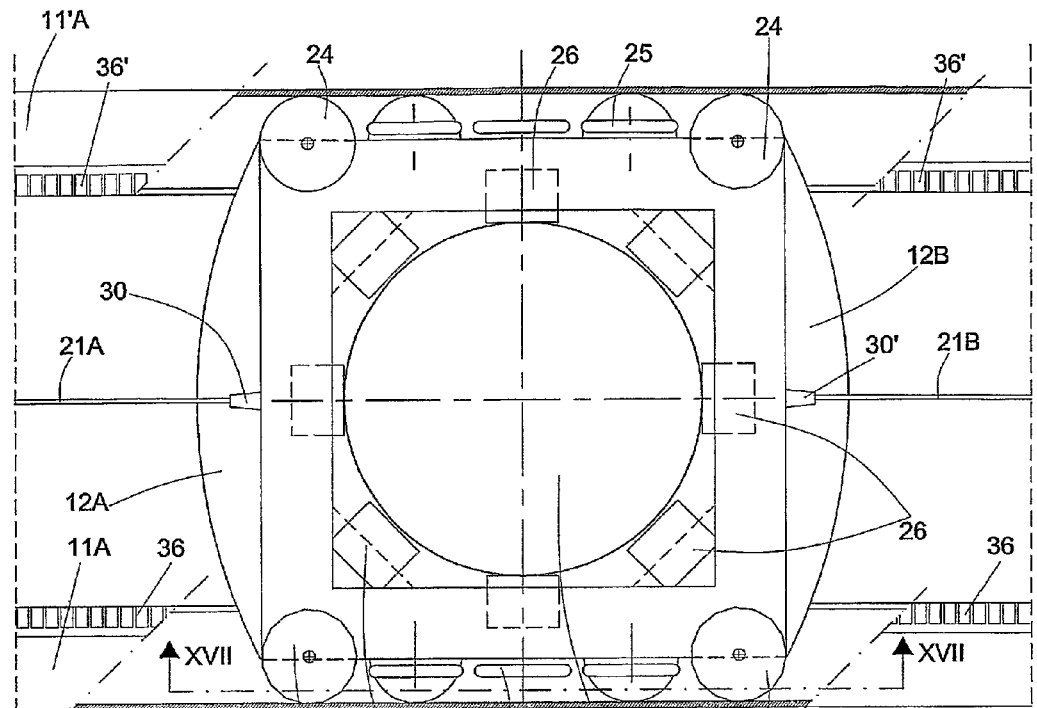
FIG. 16 is a detailed top view of the carriage along which moves the floating mobile system, with cutted away parts in the rails showing the carriage wheels and the cable which moves the carriage.
Figure 17:
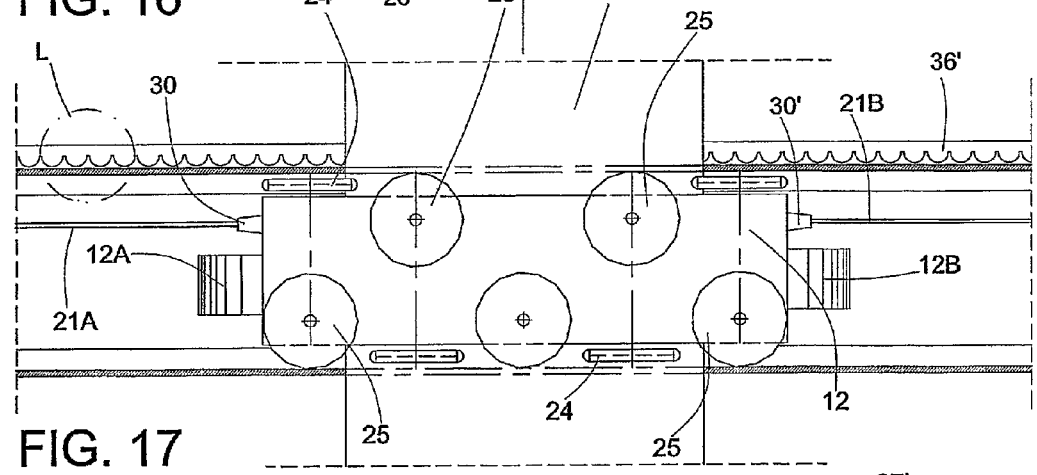
FIG. 17 is a transverse cross-section view according to XVII-XVII of FIG. 16.
Figure 20:
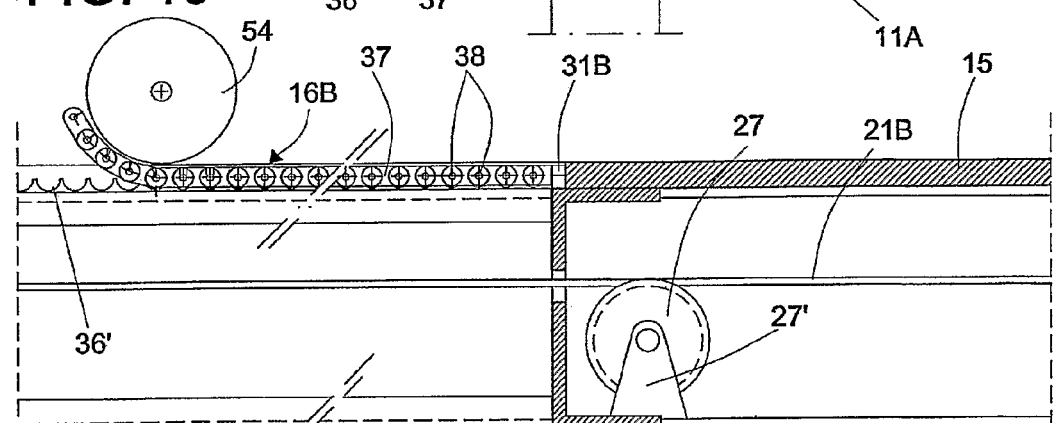
FIG. 20 is a cross-section side view according to XX-XX of FIG. 19.

The cable 21, which moves according to the average longitudinal line of the dolphin 8 circulation space, is supported by the braces 14, these ones including in this respect, along their length, rotating sheaths 14a (FIGS. 12 and 13). The return of the cable 21, referenced with the reference numeral 22 (FIGS. 8 and 14), moves inside the beam 11B. In FIG. 14, it can be seen that the return of cable 22 is supported by idle pulleys 27, whose axes are supported by the beam 11B. In FIG. 20, it can be seen, at one end of the system, the cable 21 supported by a pulley 27 whose axes are supported by ears 27' secured to the lower structure of the system 7.

The grating 16A, 16B, as it can be seen in FIG. 20, is secured by grating fixing hooks 31A, 31B respectively, (also referenced with the reference numeral 31) to the flooring structure 15 at the two ends of the mobile system 7.

On either side of the dolphin 8, as already mentioned, each grating 16A, 16B winds or unwinds about its axis 23A, 23B, the two axes being made integral with each other by two drive chains 40, which wind around the same hub as the gratings 16A and 16B, the chain windings being maintained by internal flasks ($20B_3$; $20'B_3$-$23B_3$; $23'B_3$), and external flasks ($20B_2$; $20'B_2$-$23B_2$; $23'B_2$).

The arrangement of the gratings 16A, 16B and of chains 40, 40' on the precited axes 23A, 23B is such that the unwinding of a grating involves the winding of the chain located on the same axis, which unwinds on its other axis involving in turn the winding of the other grating such that the winding and unwinding speed of the two gratings is perfectly synchronized. The unwinding is controlled by the traction on the cable 21, itself controlled by the motor 19. The starting of the motor 19 causes the rotation of the drive pulley $20A_1$, which causes a translation of the cable 21, which, secured to the carriage 12, pulls the floating mobile system arrangement in translation along the fixed dolphin 8.

The set of two axes 23A and 23B and of the chains 40, 40' is covered by a cover C; sensors 52 secured to the base of the cover C allow to stop the progress of the system if an object or foreign body comes to jam between the grating and the cover, during the movement of the mobile system arrangement moving with respect to cover C.

Figure 10:
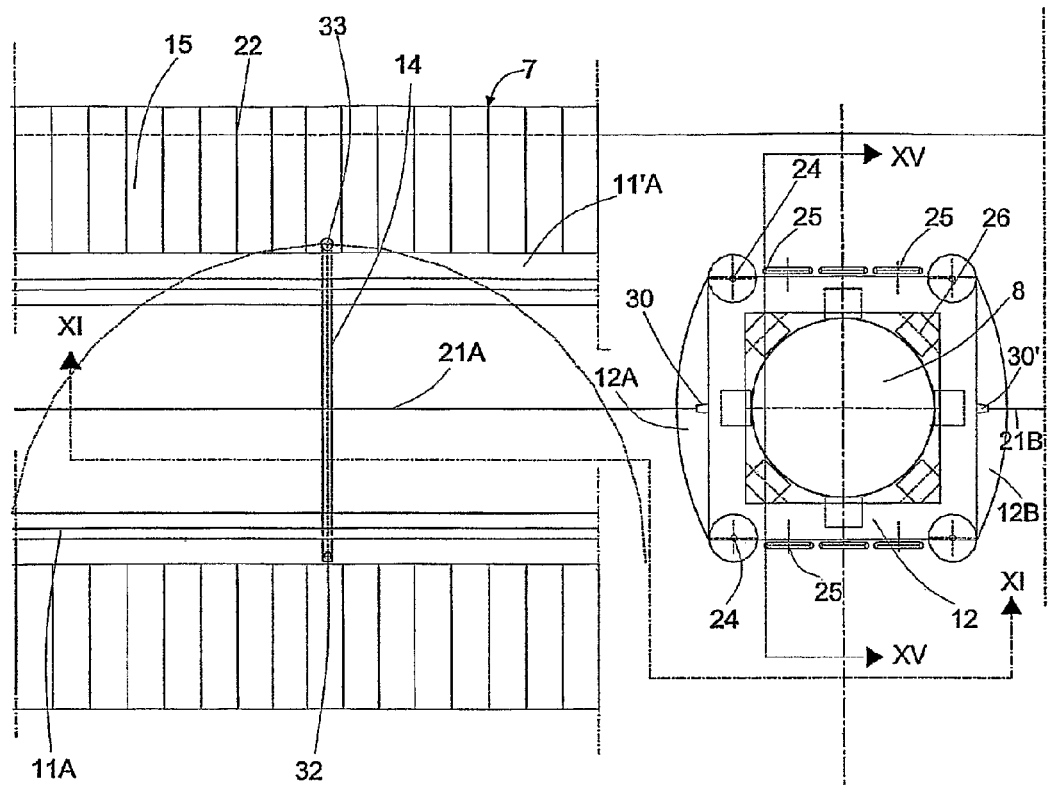
FIG. 10 is a detailed top view of the floating mobile system of FIG. 9 with its associated carriage, showing a mobile brace, with a cutted away part showing the cooperation of the carriage and the rails.

FIG. 10 is a top view showing the carriage 12 and a brace 14 of a mobile system 7, which is of the "tilting" type. The braces 14 are adapted to swing horizontally at the passage of the carriage 12, pushed by the latter, and to resume their places under the action of the rams 35 after the passage of the carriage 12, to come to lock in the opposite rail. They are secured at intervals in an alternate way on one rail and on the other one 11A, 11'A.

On the left hand side part of FIG. 10, we can see the system 7 whose rails 11A and 11'A are maintained by these mobile braces 14, which are swivelling around one of their ends 32 mounted alternatively in the rail 11A or 11'A. The free ends 33 of the braces 14, that can be seen in more detail in FIGS. 12 and 13, have a termination by the shape of a small bearing cylinder freely mounted on an axis on one side of the brace 14 and perpendicular thereto.

Figure 11:
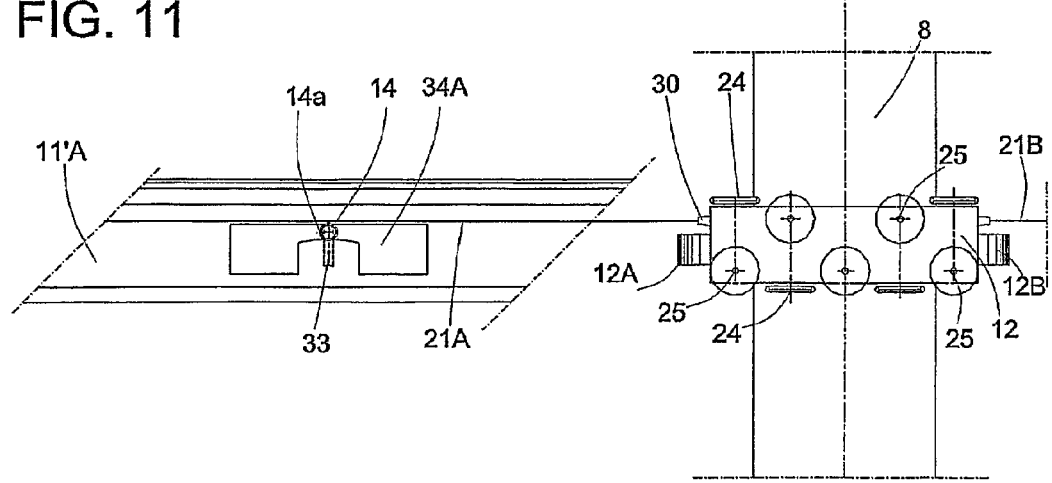
FIG. 11 is a side cross-section view according to XI-XI of FIG. 10, the cross-section being performed on a mobile brace.

On the left part of FIG. 11, it can be seen that openings or oblong openings 34A are holed in the rail 11'A, which have the general shape of a reversed U whose bore is parallel to the flooring 15 and whose branches are very large to allow the passage of the free end 33.

At the rear side of these openings 34A, are brought, to close these ones and allow the rolling of the free ends 33, circular boxes 34, such as schematically represented in FIGS. 12 and 13.

On the right part of FIG. 10 (in which only the carriage 12 and the central strands 21A, 21B of the cables have been shown), it can be seen that the edges 12A, 12B of said carriage 12, perpendicular to the rails 11A, 11'A, are rounded towards the outside of the carriage.

In operation, the braces 14 are in turn led to impinge on the facing edge 12A or 12B, which results in their clearing by swinging; the vertical cylindrical termination of the end 33 can be extracted from the rail 11'A by one of the broad vertical branches of the reversed U-shape opening 34A. The brace 14 then comes to toggle to place itself parallel to the rail 11A, as shown in dot and dash lines in FIG. 12.

When the brace 14 is not retained anymore by the carriage 12, it is returned by a ram 35 (FIGS. 12 and 13) which replaces it in its initial position to maintain the spacing of the two rails 11A and 11'A, position in which the cylindrical termination of the free end 33 is maintained in the box 34 by the horizontal part of the opening 34A, thereby avoiding the approach or the spacing of rails 11A and 11'A.

Figure 8:
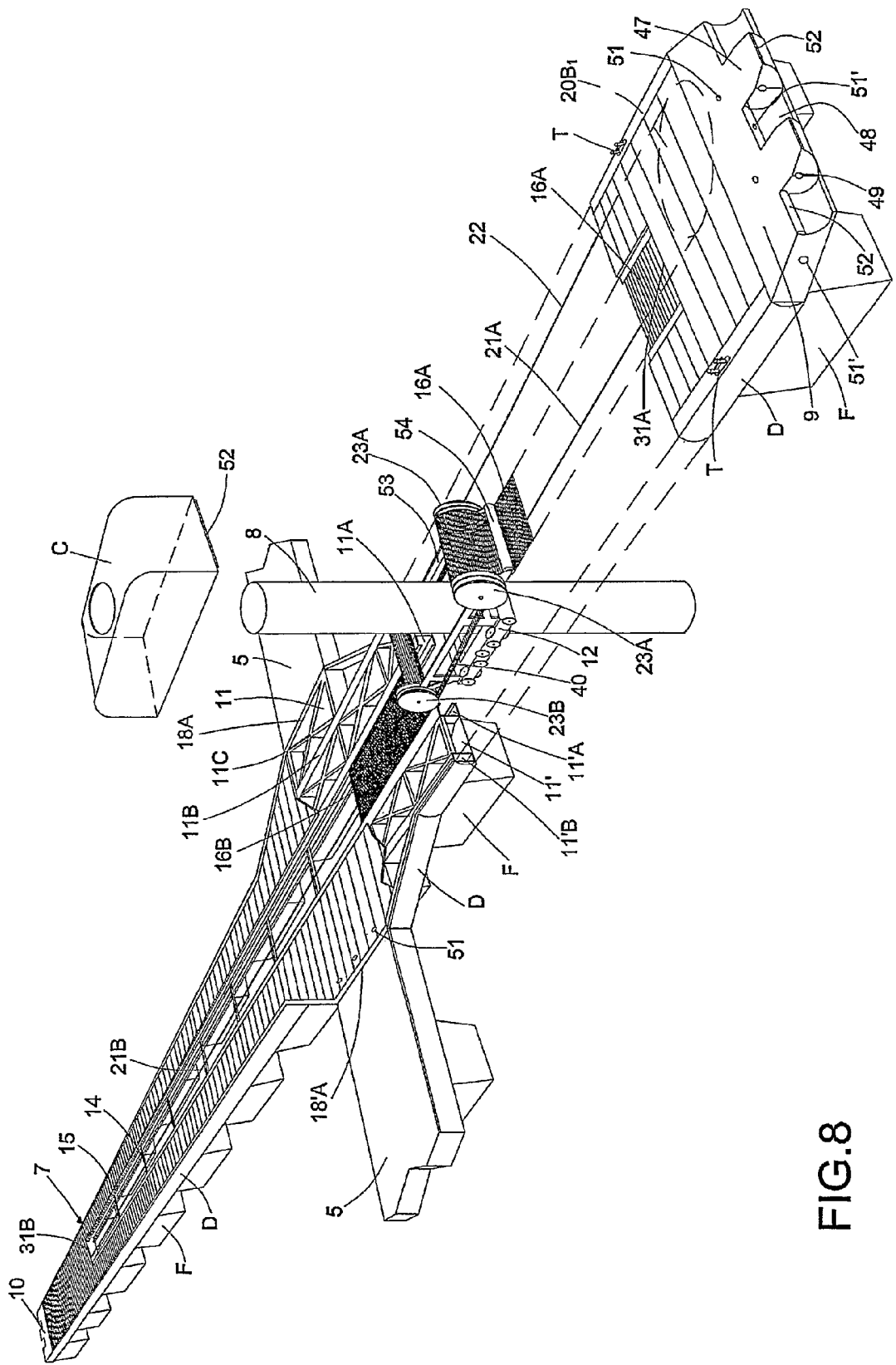
FIG. 8 is a perspective view of the floating mobile system according to first precited embodiment, with various cutted away parts showing various inner elements of the structure.
Figure 39:
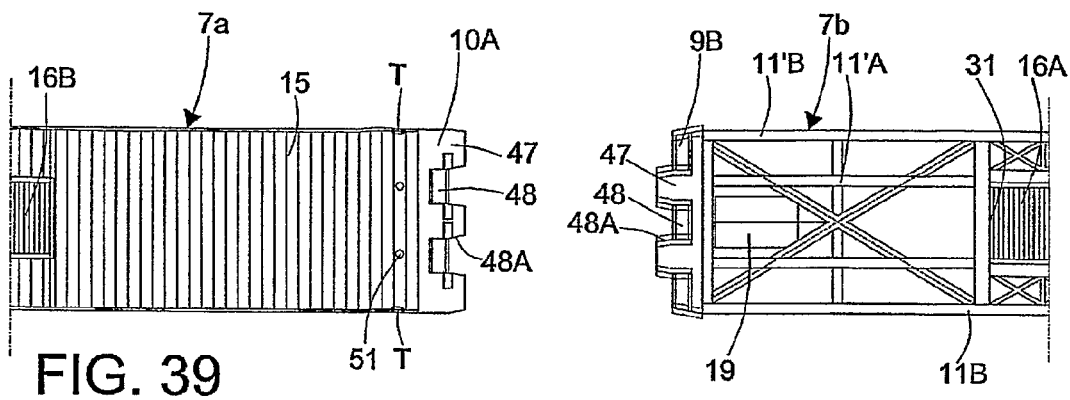
FIGS. 39 and 40 are enlarged top views of the facing ends of two floating mobile systems according to the first or second abovementioned embodiment, with liftable grating, in a disconnected position (FIG. 39) and attached position (FIG. 40) respectively.
Figure 40:
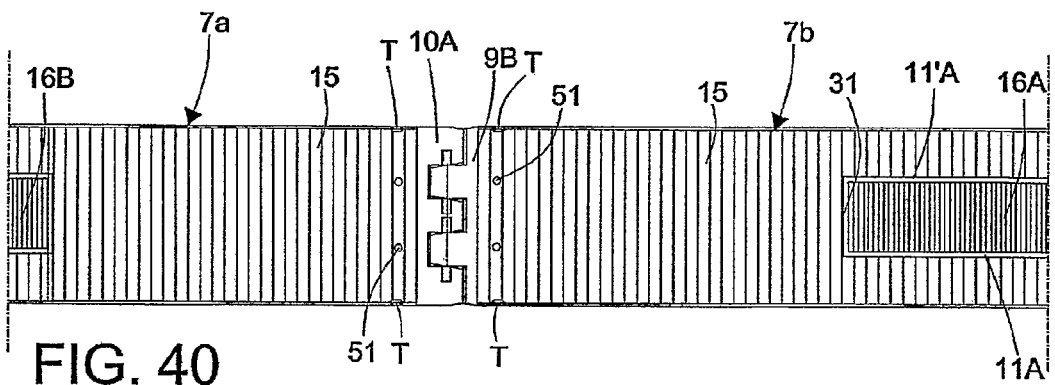

In FIG. 8, which is a perspective view of the system 7, the attaching end 99 is represented, and will be described in greater detail in FIGS. 39 to 41. These ones show indeed the connection between them of two adjacent mobile systems 7a and 7b by their male 9B and female 10A ends respectively.

The male end 9B features protruding parts 47 which cooperate with the hollow parts 48 of the female end 10A. The side faces 48A of the protruding parts 47, delimiting the hollow parts 48, are designed to allow the protruding parts 47 to embed easily in the hollow parts 48, by a more flared entry region. Indeed, the mobile systems 7a and 7b can be in a situation to attach in a non perfectly straight movement due to the movements of the surface of water.

The protruding parts 47 of the male end 9B include a horizontal hole 49 perpendicular to the faces 48A. The protruding parts 47 of the female end 10A also include each an horizontal hole receiving a finger 50 which protrudes from the side faces 48A, which is adapted to extend out of its housing to lock mechanically and/or electromagnetically the ends 9B and 10A of the mobile systems 7b and 7a, once the protruding part 47 has been introduced in the hollow part 48.

Figure 41:
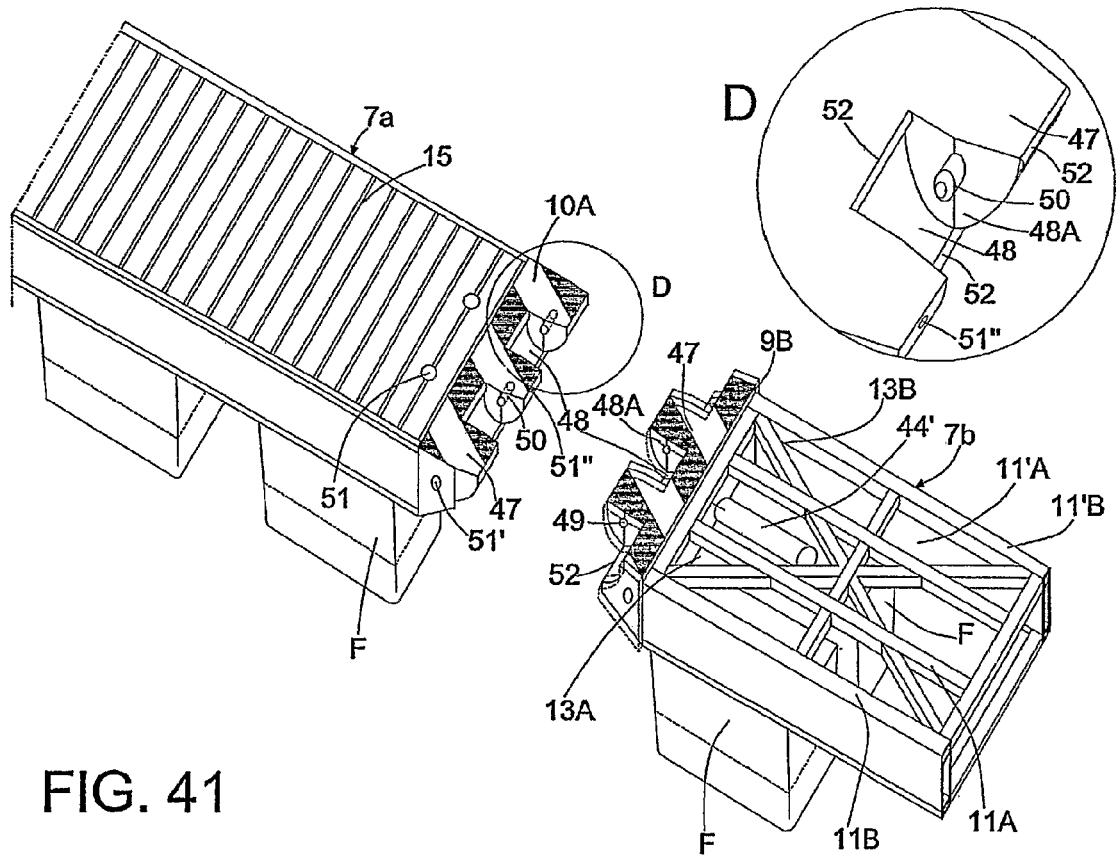
FIG. 41 is an axonometric view of the ends of two floating mobile systems of FIG. 38, with an enlarged detail showing the attaching means.

The front faces of the protruding parts 47 and the bottoms of the hollow parts 48 are of curved shape, allowing the attached systems to swivel around the axis-tip 50 in order for the mobile systems 7 to be able to follow the movements of the water surface (FIG. 41).

The male end 9 of the mobile elements is adapted to move slightly by lateral sliding, from one side or the other, driven by a motor 44' (FIG. 41) controlled by the laser guidance to catch up the alignment tolerances (movement of the water surface) in order to allow the perfect imbrication of the two systems in the last meters before their locking.

A laser guidance 51" or other lighting guidance favours the correct alignment of the two ends 9 and 10 of the systems 7 during their approach.

Some light signals 51 which switched on at the starting of the motion of the systems 7 to alert the users, are disposed at the ends 9 and 10 of the systems 7 as well as at right angles with connections 18A of the boom sections 5.

On their side edges, the ends 9B and 10A are provided with light signals 51', conventionally green or red, indicating the passage to the boats manoeuvring by night.

For safety reasons, the ends 9B and 10A can be equipped with sensors 52, which detect the possible presence of a foreign body to the system during their approach and avoiding at this moment the attaching of the two pontoons to avoid any accident.

Figure 36:
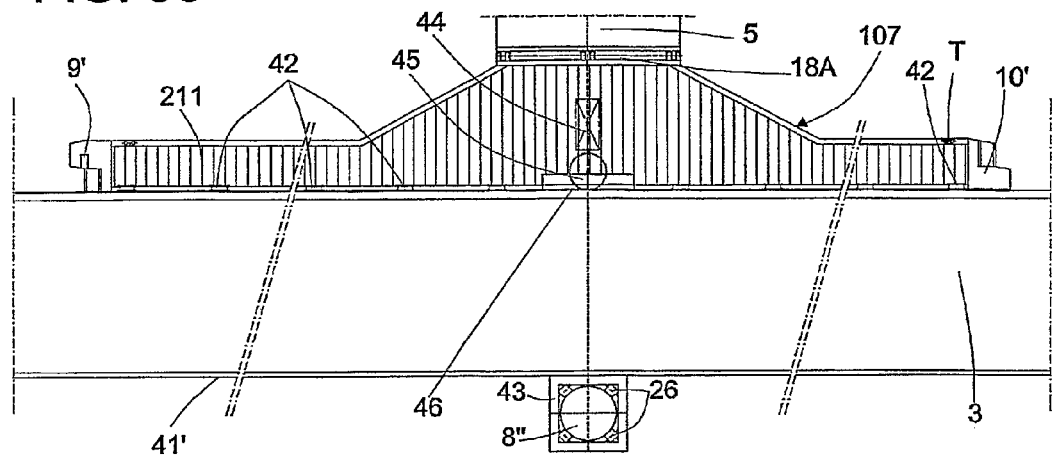
FIG. 36 shows, in partial top view and at a smaller scale, the junction of a floating mobile system referred to as a "pier" system according to the invention and of the conventional floating fixed pontoon, adjacent to the pier and adapted to move vertically to follow the level of the tides.
Figure 37:
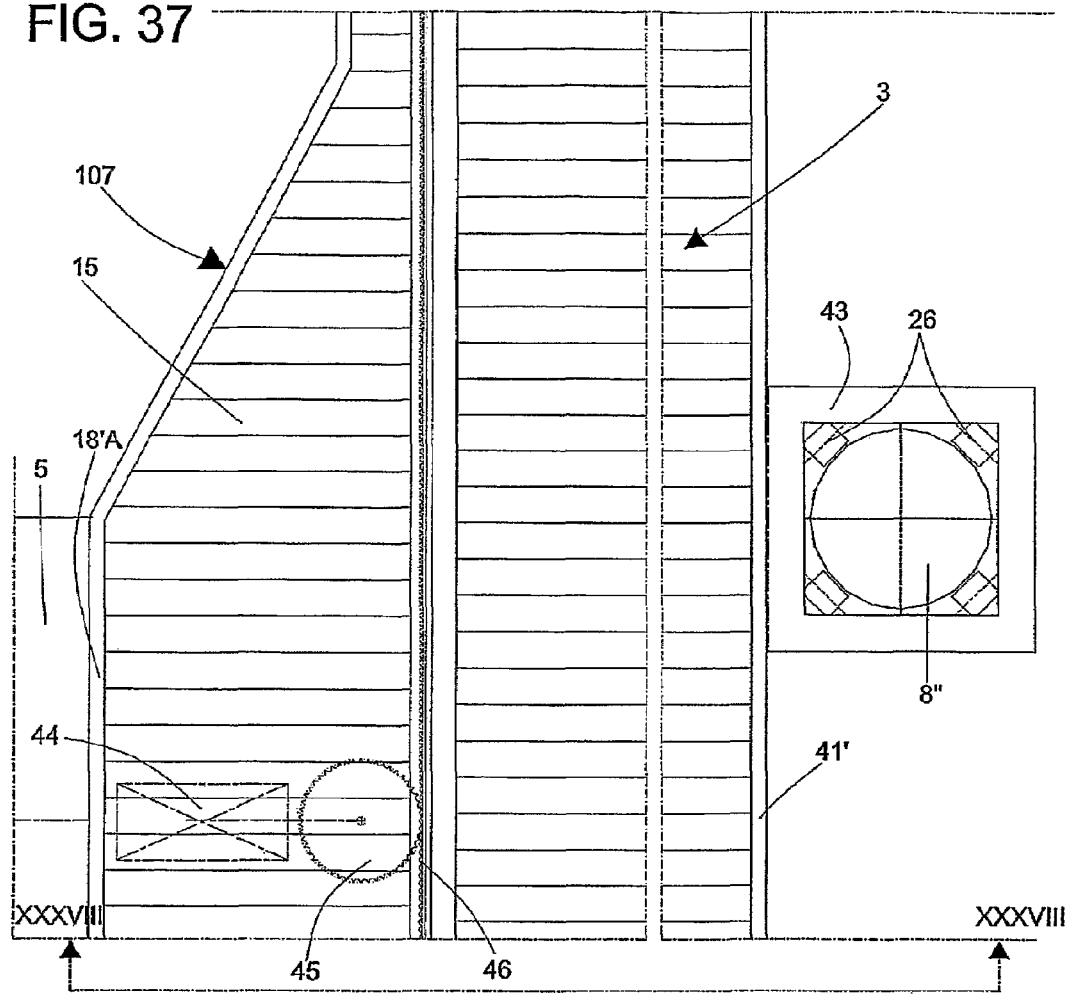
FIG. 37 is a partial top view, at a bigger scale, of the precited junction.
Figure 38:
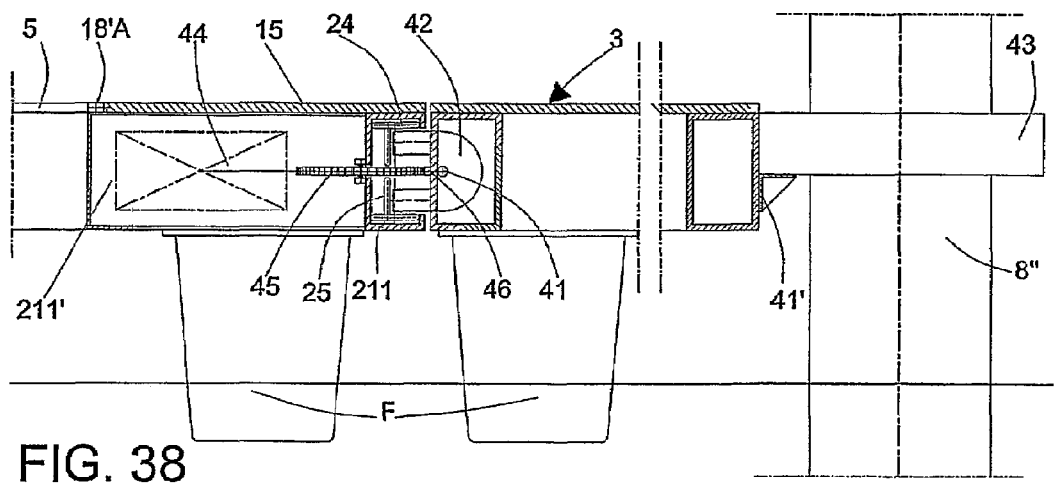
FIG. 38 is a cross-section view according to XXXVIII-XXXVIII of FIG. 37.

FIGS. 36 to 38 show how the connection is made between the pier mobile system 107 and the fixed floating pontoon 3.

In this embodiment, the fixed floating pontoon 3 is secured by means of conventional slides 43 to a first series of dolphin 8" located between the fixed pier 1 and the conventional floating pontoon 3. The pier mobile system 107 is not crossed by a dolphin 8 and does not require a windable grating system. It includes a simple beam 211 serving as a mooring arm, disposed on a series of floats F or supported by the pontoon 3 and covered with a flooring 15. The beam 211 is provided with a beam-rail partially closed like the guide rails of the carriages 12 of the systems 7, this beam-rail moving around sets 42 comprising vertical 25 and horizontal wheels 24. These sets 42 are secured at fixed regular intervals on the flank of the fixed pontoon 3 thanks to hinged fixations 41 to fit to the movement of the water surface (FIG. 38). The displacement of systems 107 referred to as head systems laterally to the fixed pontoon 3 is ensured by one or several toothed wheels 45 cooperating with a toothed rack-rail 46 secured on the pontoon 3. The pier mobile system 107 is provided at its centre, with a motor 44, which is disposed under its flooring 15 and which, to be put in motion, drives the toothed wheel 45, cooperating with the toothed rack-rail 46 located on the flank of the pontoon 3.

FIG. 36 shows at a smaller scale the set consisting of the pier mobile system 107 and the conventional floating pontoon 3, at the junction with the boom section 5 and its end connections 9' and 10'. These ends 9' and 10' correspond to end halves 9 and 10 of systems 7.

The moving motors (19; 44) and the locking and unlocking means (9-10; 9'-10') of the ends of the systems (7-207; 107) are simultaneously controlled by a boom or by a group of booms according to the needs, by all the appropriate means, especially centralised, computerized ones.

Figure 42:
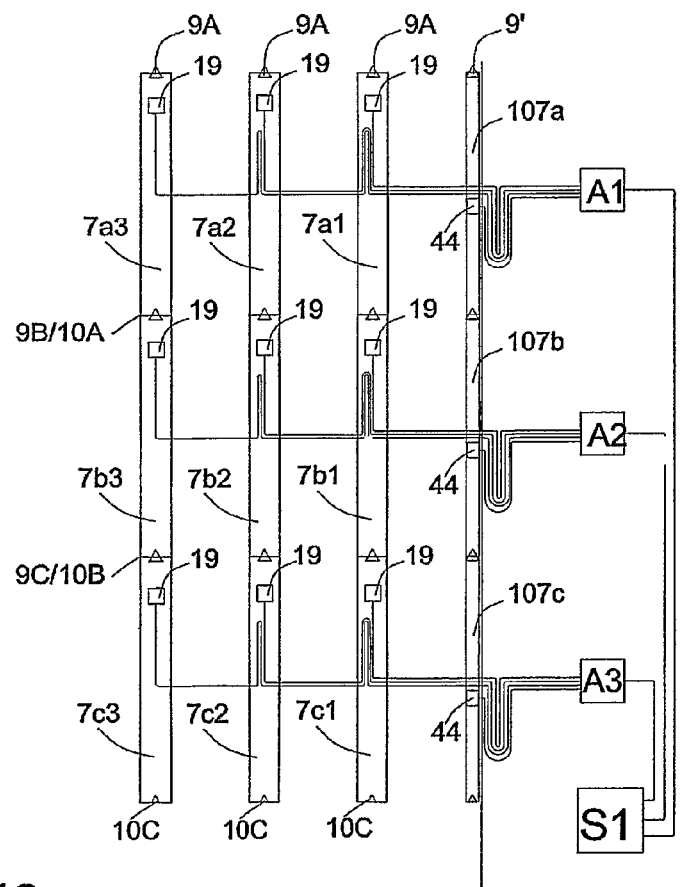
FIG. 42 is a schematic view of the electric and electromechanic control device of the booms.

A supervisor control desk can thereby be foreseen with screen in the harbour master's office (S1; FIG. 42) allowing the staff responsible to perform opening manoeuvring according to the requests (by telephone or radio) of users wishing to enter or exit, a programming of the opening and closing commands of each of the booms at fixed hours could thereby be considered. Secondary cabinets (A1, A2, A3, etc . . . ) could also be used (see FIG. 42) to gather the commands and automatisms of each boom and including the emergency stop devices at right angles with each boom on the fixed pontoon 3 or pier 1.

Likewise, an automation of the commands at the user's request directly from the pier 1 or pontoon 3 can be considered, such commands thereby being of the change or card type.

Emergency boom openings will be foreseen in case of a fire to avoid the spreading of the fire and extinction means will be positioned on the booms, the staff being able to move transversally on the elements 7 to get more rapidly on the spot of the fire.

In case of a failure of a motor or mechanical element of one of the systems 7, 207, 107, it will be possible to disconnect the faulty element, the whole systems of the invention still operating thanks to the towage of the faulty system by the other mobile elements 7, 207, 107 while waiting for the maintenance intervention.

The detailed disclosure of the means of the invention allows to understand the operation of the harbour equipped with these means, by manoeuvring a boom or a group of adjacent booms connected with each other by the ends of the systems of the invention. An important space gain for the mooring of the boats is thereby offered.

It can be added that with the mooring arrangement according to the present invention, the mooring of boats is done only on the boom sections 5 and, alongside, on the mooring arms 6, and the ends of the floating mobile systems 7.

As suggested before, the systems 7 make advantageously possible the transverse links for an easy displacement of the users from one boom to the other.

Different possible alternatives of the realization which has just been described will now be described.

FIGS. 26 and 27 show an alternative of the first embodiment of FIGS. 24 and 25, according to which the system is guided by two paired dolphins 8 instead of one, for a better hold-up (locations more exposed to the stress of weather or intended to welcome bigger boats). Each dolphin 8 includes its carriage 12, both carriages being connected by an hinged linking device 12C which allows a relative movement between the two carriages 12. Each end of the traction cable 21A, 21B is secured at one of the carriages 12.

The support structure 53 of the gratings windings 16A, 16B is adapted to the two carriages 12. In addition, the cover C is elongated to cover the whole mechanism; there are two upper openings to let the dolphin heads 8 pass.

FIGS. 28 and 29 show a second embodiment of the system 7, 207 displacement device according to which no traction cable is used. A motor 19 is embedded on the support structure 53 integral with the carriage 12; this motor 19, via a reducer 19', operates two side toothed wheels 45, 45' each of which catches in a grating clipping rack rail 36, 36', of the type of the one described with reference to the first embodiment. The starting of the motor 19 causes the rotation of the wheels 45, 45' which, by driving the associated rack rails 36, 36', move the system 7.

A system allowing the deployment and folding of the motor supply cable 19 will advantageously be provided in the case of this embodiment.

FIGS. 30 and 31 show this second embodiment, with the two dolphins alternative, as in FIGS. 26-27. In this case, the motor 19 is advantageously disposed between the two dolphins 8.

Figure 32:
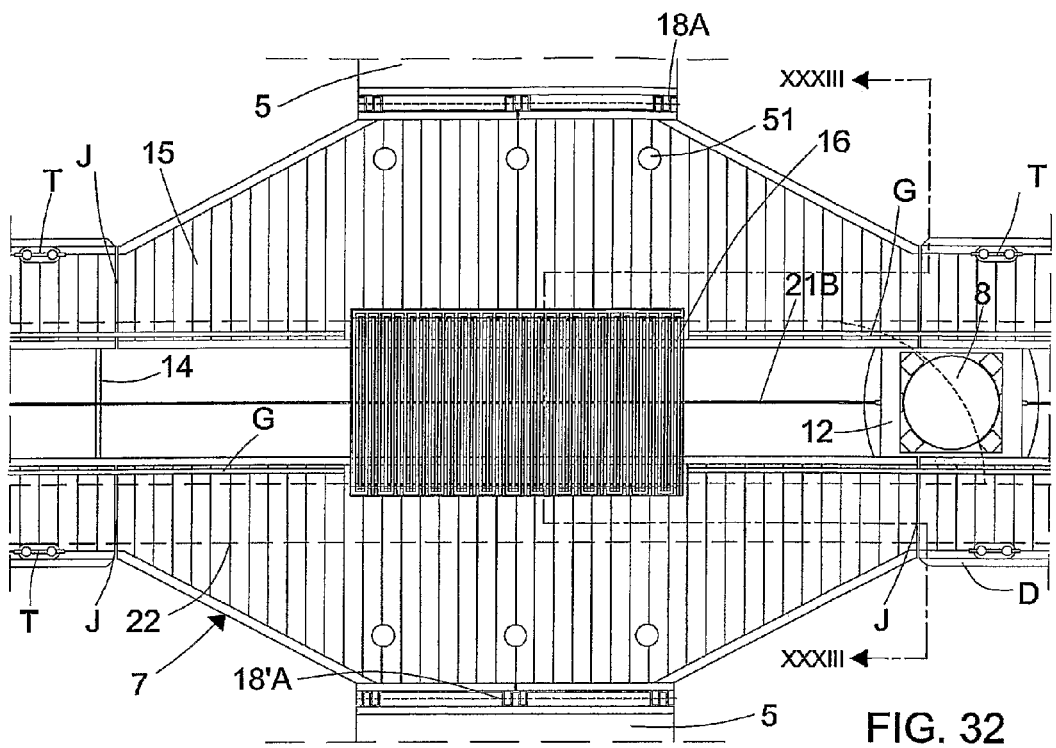
FIG. 32 is a top view of the central part of the floating mobile system, comprising the driving means of the first embodiment, in an alternative using no grating retractable by winding, but a system of side protection barriers and a central walkway which is retractable by swivelling and which is located in the axis of the associated boom.
Figure 33:
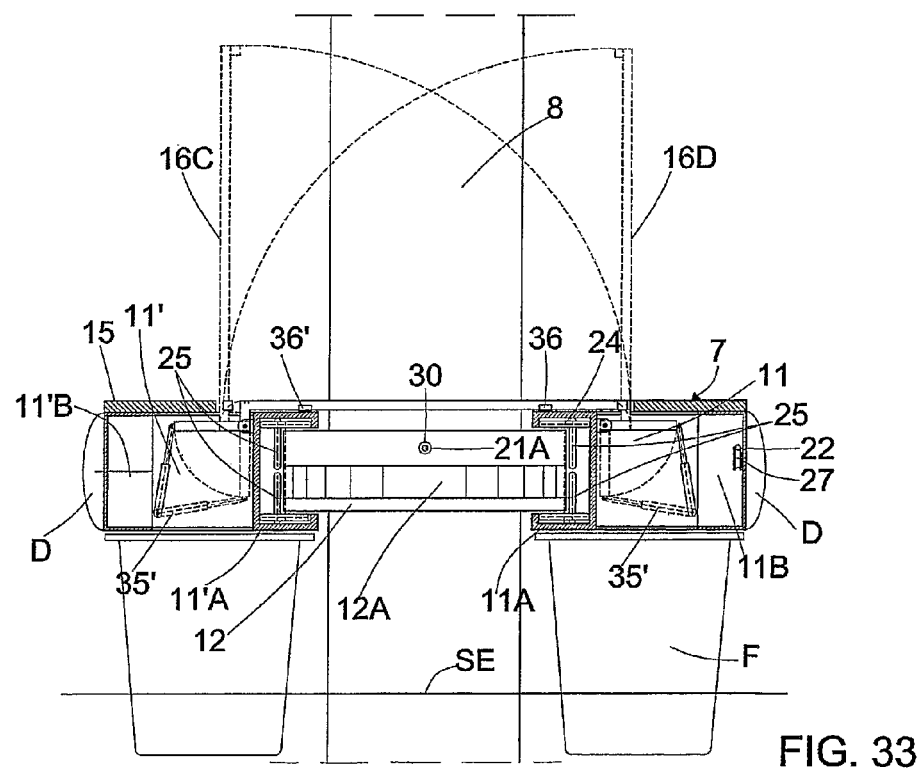
FIG. 33 is, at a bigger scale, a transverse cross-section view according to XXXIII-XXXIII of FIG. 32, the raised position of the walkway appearing in dot and dash lines.

FIGS. 32 and 33 show an alternative of protection of the system 7, 207 central opening according to which windable gratings are not used anymore. However, the protection is ensured by a guard rail G disposed all around the translation area of the dolphin 8 inside the system 7. A passage area, in the axis of the boom sections 5, is arranged thanks to a liftable walkway 16, consisting for example, of elements that can be imbricated 16C, 16D (FIGS. 4; 33 and 34) also used, in the folded position, to maintain the spacing between the rails 11A and 11'B, their ends being adapted in this respect, and, in the raised position, ensuring the continuity of the guard rails G.

In FIG. 33, SE references the level of the water surface.

Figure 34:
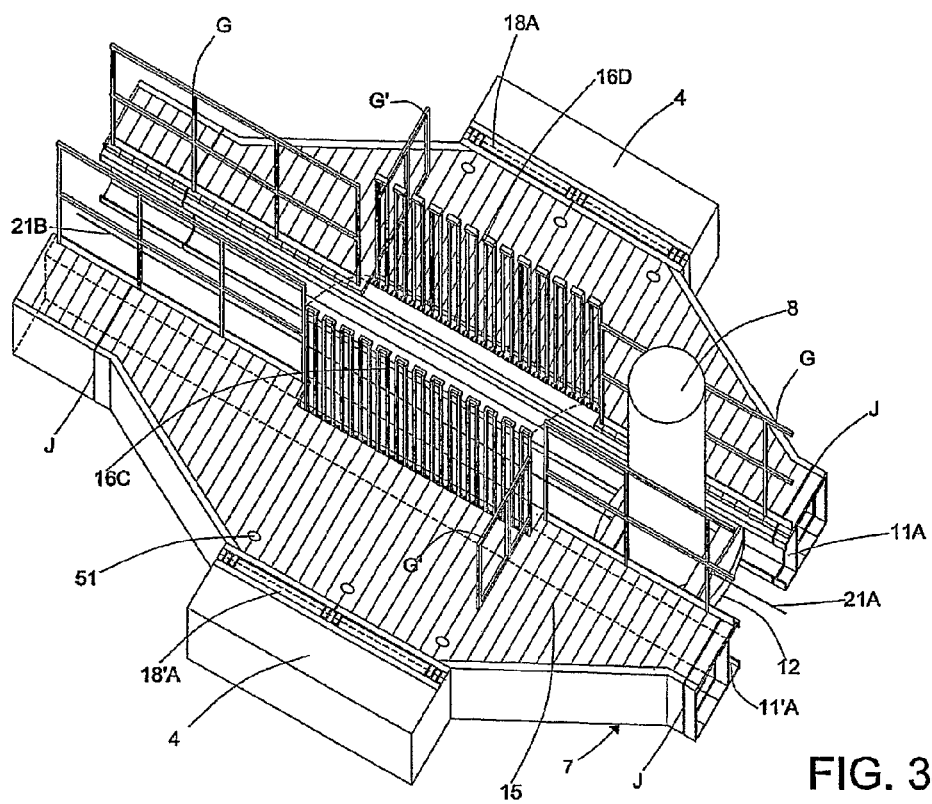
FIGS. 34 and 35 are axonometric views of the central part of the floating mobile system of FIG. 32, in two different positions, the first one with the two parts of the walkway raised to allow the passage of this central part at the dolphin while the floating mobile system is moving, the second one, with the two parts of the walkway hinged down to allow the users float traffic.

The walkway 16 passes from a closed position (FIG. 35) to an open position (FIG. 34) during the system 7, 207 displacement at the dolphin 8. The two parts 16C, 16D of the walkway 16 are operated by lifting rams 35' (FIG. 33).

To be able to protect both sides of the walkway 16 in the folded position (FIG. 35), the facing end elements of each walkway 16C, 16D include a guard rail G' as a return.

Figure 35:
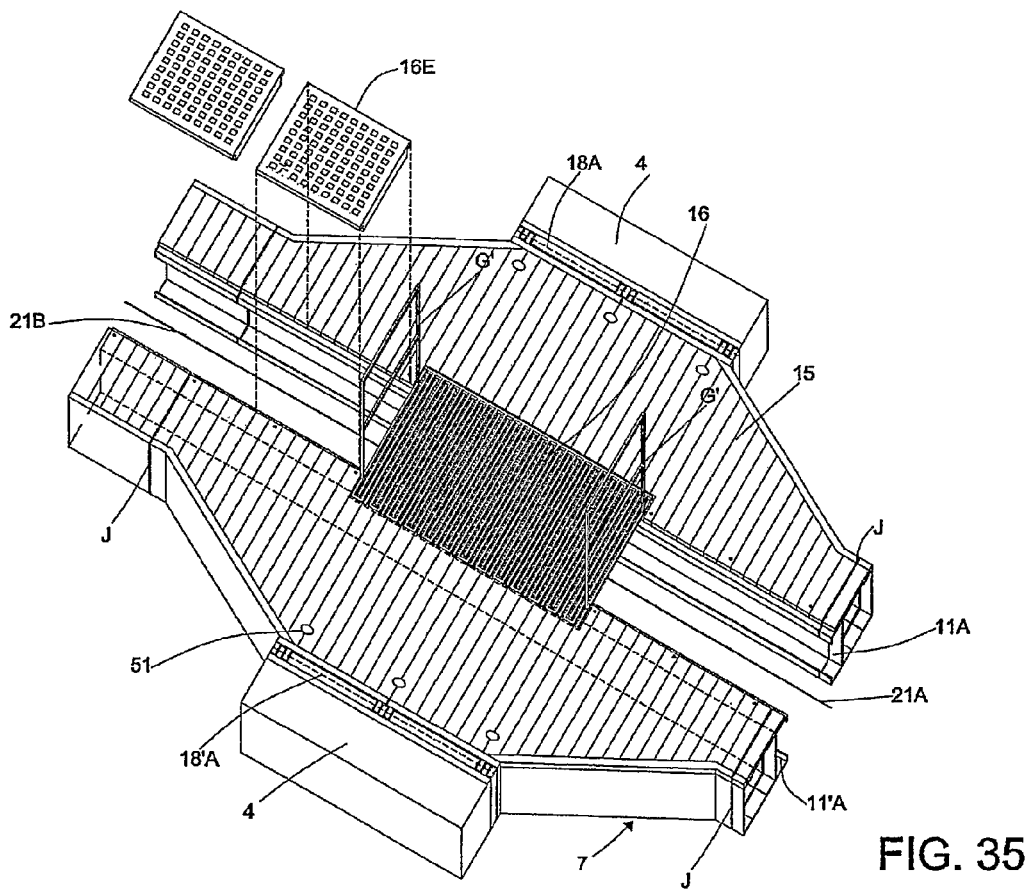

In FIG. 35, removable gratings 16E are shown which are intended to close the opening between the two rails 11A, 11'A during events such as shows boat, shows nautical exhibitions, etc . . . In these cases, the systems 7 are deactivated and the guardrails G, advantageously removable, are dismounted.

It is further understood that the embodiments which have been described above are indicative only and not limiting and that modifications can be done without departing from the scope of the present invention. It is thereby particularly that the mechanism allowing the floating mobile system displacement will also be able to be ensured by:

a displacement caused by the rotation inside of the two guide-rails of an endless screw, also operated by an electric motor, located in one of the ends of each floating mobile system;

a displacement by hydraulic telescopic rams;

a displacement by inversion of the rotation direction of propellers located uprightly to the floats of the central parts, ensuring movements in one direction or in the other of the elements; the rotation of these propellers, fold-away from the water when not used would also be ensured by electrical motors; or the rotation of paddle wheels located under the arrangement pieces at each end of the floating systems.

We could also consider a winding of the gratings 16A, 16B no more in the vicinity of the carriages but at the respective end of the floating mobile system of the invention, under the flooring thereof, systems of synchronization chains systems being maintained in the central part.

The braces 14 could also be arranged to slide parallel to themselves at an end of the floating mobile system.

The invention claimed is:

1. Arrangement of motorised floating mobile systems (7; 107; 207) for moving mooring booms (4A to 4E) of boats B and floating vessels in inner harbours P, in order to translationally move said booms (4A to 4E) along a trajectory perpendicular thereto, in such a way that a manoeuvring space of boats B and floating vessels can be provided between at least two adjacent booms (4; 4A to 4E), whereas the other spaces between booms are closed for manoeuvring, each system including:

means (5) for fixing booms or sections thereof, which are disposed in a perpendicular direction to the translation direction;

means (9, 10) which are arranged on the two ends of the system and enable said system to be attached to an identical system in the front thereof or to an attaching means arranged on the end of a pier or a fixed boom;

means for translationally guiding in a direction parallel to a pier or a main pontoon, with respect to a fixed point consisting of a pile or dolphin (8) or group of piles or dolphins driven into the bottom of the inner harbour, said fixed points of said arrangement being provided to be positioned following a regular grid pattern whose axes are perpendicular and parallel to said pier or main pontoon and which has a mesh size suitable to allow the abovementioned manoeuvring of a boom or a group of adjacent booms attached by their ends, with some systems (107) being adapted to be guided by a fixed pontoon (3); and means which translationally move the booms, said arrangement moving means being controlled by means for synchronously controlling said manoeuvring.

2. Arrangement according to claim 1, characterized in that the ends of the floating mobile systems support mooring means so as to form mooring arms.

3. Arrangement according to claim 1 or 2, characterized in that the systems are disposed so that in a stop position, they are always, at one end, in abutment with a pile or dolphin (8), and, at the other, locked on the end of a facing identical system or on the end of a pontoon or fixed pier, the ends of said identical system or said fixed pontoon being themselves in abutment with another pile or dolphin (8).

4. Arrangement according to claim 1, characterized in that the means (9, 10) provided for attaching and disconnecting two adjacent booms are disposed to ensure a link adapted to withstand bad weather conditions and follow water movements and the tides.

5. Arrangement according to claim 1, characterized in that the means for translationally guiding a floating mobile system consists of a carriage (12) surrounding a dolphin (8) forming a slide able to go up and down along the dolphin (8) to follow water movements or the tides, said carriage externally comprising rolling devices (24, 25) adapted to cooperate with rails (11A, 11'A) of the floating mobile system.

6. Arrangement according to claim 5, characterized in that each floating mobile system (7) is driven by at least one cable (21) connected to the carriage (12) at both opposite edges (12A, 12B) thereof perpendicular to rails (11A, 11'A), and likely to be drawn by a motor (19) so that the traction of a cable connected to one edge allows the floating mobile structure to slide in the direction opposite to the traction exerted by the cable.

7. Arrangement according to claim 5, characterized in that a motor (19) embedded on the carriage (12) puts in motion one or more toothed wheels (45) which move on one or two rack-rails (36), so that this movement involves the displacement of the floating mobile system in one direction or in the other.

8. Arrangement according to claim 5, characterized in that a floating mobile system includes an elongated support structure with two facing beams (11, 11') carrying internally the rails (11A, 11'A) provided to cooperate with the rolling devices (24, 25) of the carriage (12) of the dolphin (8), said beams (11, 11') being joined at their ends by bonding structures (13B, 13C), said beams and, when applicable, the bonding structures, being supported by at least a flotation device (F, F1), means (18, 18') being supported by said beams allowing their connection to the boom or boom sections, with possible reinforcement uprightly from said connection by triangulation rams (17), the ends of said structure having complementary attaching means to means supported by the structure of the adjacent floating mobile system, in order to constitute trains of floating mobile systems in the attached positions of the systems concerned.

9. Arrangement according to claim 8, characterized in that the two spaces between the two rails (11A, 11'A) from either side of the carriage (12) associated with the dolphin (8) are closed by a grating (16A, 16B) which winds and unwinds from either side of the carriage depending on the displacement of the floating mobile system with respect to the dolphin (8), a flooring (15) allowing the users float traffic covering the structure around the grating.

10. Arrangement according to claim 9, characterized in that means are provided to allow the winding or the unwinding of one of the gratings at a speed depending on the unwinding or the winding of the other grating.

11. Arrangement according to claim 10, characterized in that winding/unwinding means of a grating with respect to the other one consists of at least one chain (40) whose length and thickness are proportional respectively to the length and thickness of the windable grating and mounted to wind around the winding axis of the first grating in a direction opposite to the winding direction thereof and on the parallel axis of the second grating also in the direction opposite to the winding direction thereof, so that, when the first grating is fully wound on its axis, the chain (40) is completely unwound on this same axis and is completely wound on said second axis, whereas the second grating is completely unwound, said chain being driven by the unwinding of the first grating, itself driven by the motor moving the structure.

12. Arrangement according to claim 8, characterized in that the protection of the central opening of the systems is provided by a guardrail (G) positioned around the translation area of the dolphin (8), a passage area in the axis of the boom sections being arranged thanks to a liftable walkway (16C, 16D).

13. Arrangement according to claim 8, characterized in that between the two rails (11A, 11'A), are disposed maintaining braces (14), said braces being arranged to disappear when the displacement of the structure leads them in the vicinity of the carriage edges (12A, 12B) and being adapted to be used as support to a traction cable.

14. Arrangement according to claim 1, characterized in that each boom comprises several mooring pontoon sections connected to the floating mobile systems (7a, 7b, 7c, 7d), being completed by a floating mobile system (107a, 107b, 107c, 107d) named pier system, adapted to slide along a conventional fixed floating pontoon (3) and by a floating mobile system, named head system (207a, 207b, 207c, 207d), located at the opposite end of the boom, on the boat side, and being adapted to be used as a waiting pontoon.

15. Arrangement according to claim 1, characterized in that the connection between the booms or boom sections and the mobile systems is performed at a level selected to allow, on either side of the boom, two equal or different lengths, depending on the needs, of location for the boats B and floating vessels.

16. Arrangement according to claim 5, characterized in that each fixed point is formed by several dolphins whose associated carriages are connected by a hinged bonding device.

17. Port installation comprising booms adapted to move by the arrangement of motorised floating mobile systems such as defined in claim 1.

* * * * *